US009462170B2

(12) United States Patent
Laroia et al.

(10) Patent No.: US 9,462,170 B2
(45) Date of Patent: Oct. 4, 2016

(54) LIGHTING METHODS AND APPARATUS

(71) Applicant: THE LIGHTCO INC., Palo Alto, CA (US)

(72) Inventors: Rajiv Laroia, Far Hills, NJ (US); Sapna A Shroff, Sunnyvale, CA (US)

(73) Assignee: THE LIGHTCO INC., Palo Alto, CA (US)

( * ) Notice: Subject to any disclaimer, the term of this patent is extended or adjusted under 35 U.S.C. 154(b) by 0 days.

(21) Appl. No.: 14/599,985

(22) Filed: Jan. 19, 2015

(65) Prior Publication Data

US 2015/0244908 A1 Aug. 27, 2015

Related U.S. Application Data

(60) Provisional application No. 61/943,302, filed on Feb. 21, 2014, provisional application No. 62/099,227, filed on Jan. 2, 2015.

(51) Int. Cl.
*H04N 5/225* (2006.01)
*H04N 5/238* (2006.01)
(Continued)

(52) U.S. Cl.
CPC .......... *H04N 5/2256* (2013.01); *H04N 5/2254* (2013.01); *H04N 5/2258* (2013.01);
(Continued)

(58) Field of Classification Search
CPC ...... F21V 5/04; F21V 23/0442; F21V 14/04; F21V 7/04; F21Y 2101/02; H04N 5/2554; H04N 5/2256; H04N 5/2352; H04N 5/238; H04N 5/3532
See application file for complete search history.

(56) References Cited

U.S. PATENT DOCUMENTS 4,890,133 A 12/1989 Ogawa et al.
5,078,479 A 1/1992 Vuilleumier
(Continued)

FOREIGN PATENT DOCUMENTS

EP 2642757 A2 9/2013
JP 10091765 4/1998
(Continued)

OTHER PUBLICATIONS

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.
(Continued)

*Primary Examiner* — Amy Hsu
(74) *Attorney, Agent, or Firm* — Michael P. Straub; Ronald P. Straub; Abbas Zaidi

(57) ABSTRACT

Illumination methods and apparatus are described. In some embodiments a lighting device includes one or more lighting modules. At least some but not necessarily all lighting modules include a light source, e.g., LED or bulb, a collimating lens positioned in front of said light source for generating a beam of light from light output by said light source and a beam flattening lens for flattening the beam of light in at least a first direction as it passes through the first beam flattening lens. In some but not necessarily all embodiments lighting modules are controlled based on which portion of a scene is being captured at a point in time thereby avoiding the need to illuminate the entire scene for the full duration of an image capture period. The lighting device may be used in combination with a rolling shutter and a sensor used to capture one or more images.

16 Claims, 24 Drawing Sheets

(51) Int. Cl.

| | | |
|---|---|---|
| *H04N 5/235* | (2006.01) | |
| *H04N 5/353* | (2011.01) | |
| *F21V 5/04* | (2006.01) | |
| *F21V 7/04* | (2006.01) | |
| *F21V 14/04* | (2006.01) | |
| *F21V 23/04* | (2006.01) | |
| *F21Y 101/02* | (2006.01) | |
| *F21Y 101/00* | (2016.01) | |

(52) U.S. Cl.
CPC ........... *H04N 5/238* (2013.01); *H04N 5/2352* (2013.01); *H04N 5/3532* (2013.01); *F21V 5/04* (2013.01); *F21V 7/04* (2013.01); *F21V 14/04* (2013.01); *F21V 23/0442* (2013.01); *F21Y 2101/00* (2013.01); *F21Y 2101/02* (2013.01)

(56) References Cited

U.S. PATENT DOCUMENTS

| | | |
|---|---|---|
| 5,353,068 A | 10/1994 | Moriwake |
| 5,781,331 A | 7/1998 | Carr et al. |
| 5,889,553 A | 3/1999 | Kino et al. |
| 5,975,710 A | 11/1999 | Luster |
| 5,982,951 A | 11/1999 | Katayama et al. |
| 6,081,670 A | 6/2000 | Madsen et al. |
| 6,141,034 A | 10/2000 | McCutchen |
| 7,009,652 B1 | 3/2006 | Tanida et al. |
| 7,280,735 B2 | 10/2007 | Thibault |
| 7,315,423 B2 | 1/2008 | Sato |
| 7,551,358 B2 | 6/2009 | Lee et al. |
| 7,561,201 B2 | 7/2009 | Hong |
| 7,810,511 B2 | 10/2010 | Fagrenius et al. |
| 8,144,230 B2 | 3/2012 | Watanabe et al. |
| 8,194,169 B2 | 6/2012 | Tamaki et al. |
| 8,199,222 B2 | 6/2012 | Drimbarean et al. |
| 8,237,841 B2 | 8/2012 | Tanida et al. |
| 8,320,051 B2 | 11/2012 | Matsumura et al. |
| 8,482,637 B2 | 7/2013 | Ohara et al. |
| 8,520,022 B1 | 8/2013 | Cohen et al. |
| 8,553,106 B2 | 10/2013 | Scarff |
| 8,619,082 B1 | 12/2013 | Ciurea et al. |
| 8,639,296 B2 | 1/2014 | Ahn et al. |
| 8,665,341 B2 | 3/2014 | Georgiev et al. |
| 8,704,944 B1 | 4/2014 | Wierzoch et al. |
| 8,780,258 B2 | 7/2014 | Lee |
| 8,896,655 B2 | 11/2014 | Mauchly et al. |
| 9,041,826 B2 | 5/2015 | Jung et al. |
| 2002/0149691 A1 | 10/2002 | Pereira et al. |
| 2003/0020814 A1 | 1/2003 | Ono |
| 2003/0185551 A1* | 10/2003 | Chen .................. G02B 7/14 396/73 |
| 2004/0227839 A1 | 11/2004 | Stavely et al. |
| 2006/0067672 A1 | 3/2006 | Washisu et al. |
| 2006/0187338 A1 | 8/2006 | May et al. |
| 2006/0221218 A1 | 10/2006 | Adler et al. |
| 2006/0238886 A1 | 10/2006 | Kushida et al. |
| 2007/0050139 A1 | 3/2007 | Sidman |
| 2007/0127915 A1 | 6/2007 | Lu et al. |
| 2007/0177047 A1 | 8/2007 | Goto |
| 2007/0182528 A1 | 8/2007 | Breed et al. |
| 2008/0030592 A1* | 2/2008 | Border .................. H04N 5/232 348/218.1 |
| 2008/0074755 A1 | 3/2008 | Smith |
| 2008/0084484 A1 | 4/2008 | Ochi et al. |
| 2008/0111881 A1 | 5/2008 | Gibbs et al. |
| 2008/0180562 A1 | 7/2008 | Kobayashi |
| 2008/0211941 A1 | 9/2008 | Deever et al. |
| 2008/0219654 A1 | 9/2008 | Border et al. |
| 2008/0247745 A1 | 10/2008 | Nilsson |
| 2008/0251697 A1 | 10/2008 | Park et al. |
| 2008/0278610 A1 | 11/2008 | Boettiger |
| 2009/0086032 A1 | 4/2009 | Li |
| 2009/0154821 A1 | 6/2009 | Sorek et al. |
| 2009/0225203 A1* | 9/2009 | Tanida .................. G02B 3/0056 348/262 |
| 2009/0278950 A1 | 11/2009 | Deng et al. |
| 2010/0013906 A1* | 1/2010 | Border .................. H04N 5/2259 348/36 |
| 2010/0045774 A1 | 2/2010 | Len et al. |
| 2010/0053414 A1 | 3/2010 | Tamaki et al. |
| 2010/0097443 A1 | 4/2010 | Lablans |
| 2010/0225755 A1 | 9/2010 | Tamaki et al. |
| 2010/0238327 A1 | 9/2010 | Griffith et al. |
| 2010/0265346 A1 | 10/2010 | Iizuka |
| 2010/0283842 A1 | 11/2010 | Guissin et al. |
| 2010/0296802 A1 | 11/2010 | Davies |
| 2011/0051243 A1 | 3/2011 | Su |
| 2011/0063325 A1 | 3/2011 | Saunders |
| 2011/0069189 A1 | 3/2011 | Venkataraman et al. |
| 2011/0080655 A1 | 4/2011 | Mori |
| 2011/0128393 A1 | 6/2011 | Tavi et al. |
| 2011/0157430 A1 | 6/2011 | Hosoya et al. |
| 2011/0157451 A1 | 6/2011 | Chang |
| 2011/0187878 A1 | 8/2011 | Mor et al. |
| 2011/0222167 A1 | 9/2011 | Iwasawa |
| 2011/0242342 A1 | 10/2011 | Goma et al. |
| 2011/0280565 A1 | 11/2011 | Chapman et al. |
| 2011/0285895 A1 | 11/2011 | Weng et al. |
| 2012/0002096 A1 | 1/2012 | Choi et al. |
| 2012/0033069 A1 | 2/2012 | Becker et al. |
| 2012/0155848 A1 | 6/2012 | Labowicz et al. |
| 2012/0162464 A1 | 6/2012 | Kim |
| 2012/0188391 A1 | 7/2012 | Smith |
| 2012/0242881 A1 | 9/2012 | Suzuki |
| 2012/0249815 A1 | 10/2012 | Bohn et al. |
| 2012/0257013 A1 | 10/2012 | Witt et al. |
| 2012/0257077 A1 | 10/2012 | Suzuki |
| 2012/0268642 A1 | 10/2012 | Kawai |
| 2013/0027353 A1 | 1/2013 | Hyun |
| 2013/0050564 A1 | 2/2013 | Adams, Jr. et al. |
| 2013/0057743 A1 | 3/2013 | Minagawa et al. |
| 2013/0064531 A1 | 3/2013 | Pillman et al. |
| 2013/0076928 A1 | 3/2013 | Olsen et al. |
| 2013/0086765 A1 | 4/2013 | Chen |
| 2013/0093842 A1 | 4/2013 | Yahata |
| 2013/0100272 A1* | 4/2013 | Price .................. G02B 7/38 348/79 |
| 2013/0153772 A1 | 6/2013 | Rossi et al. |
| 2013/0155194 A1 | 6/2013 | Sacre et al. |
| 2013/0194475 A1 | 8/2013 | Okamoto |
| 2013/0222676 A1 | 8/2013 | Ono |
| 2013/0223759 A1 | 8/2013 | Nishiyama |
| 2013/0250125 A1 | 9/2013 | Garrow et al. |
| 2013/0258044 A1 | 10/2013 | Betts-Lacroix |
| 2014/0063018 A1 | 3/2014 | Takeshita |
| 2014/0111650 A1 | 4/2014 | Georgiev et al. |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0204244 A1 | 7/2014 | Choi et al. |
| 2014/0226041 A1 | 8/2014 | Eguchi et al. |
| 2014/0267243 A1 | 9/2014 | Venkataraman et al. |
| 2014/0354714 A1 | 12/2014 | Hirschler et al. |
| 2015/0035824 A1 | 2/2015 | Takahashi et al. |
| 2015/0043808 A1 | 2/2015 | Takahashi et al. |
| 2015/0154449 A1 | 6/2015 | Ito et al. |
| 2015/0156399 A1 | 6/2015 | Chen et al. |
| 2015/0234149 A1 | 8/2015 | Kreitzer et al. |
| 2015/0244949 A1 | 8/2015 | Laroia et al. |
| 2015/0253647 A1 | 9/2015 | Mercado |
| 2015/0279012 A1 | 10/2015 | Brown et al. |
| 2016/0142610 A1 | 5/2016 | Rivard et al. |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |

(56) References Cited

FOREIGN PATENT DOCUMENTS

| | | |
|---|---|---|
| JP | 2010049263 | 3/2010 |
| JP | 2010256397 | 11/2010 |
| KR | 100153873 | 7/1998 |
| KR | 1020080022260 | 3/2008 |
| KR | 1020130038076 | 4/2013 |

OTHER PUBLICATIONS

Robertson, M et al "Dynamic Range Improvement Through Multiple Exposures". 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

International Search Report from International Application No. PCT/US14/10267, pp. 1-5, dated Jul. 8, 2014.

Written Opinion of the International Searching Authority from International Application No. PCT/US14/10267, pp. 1-29, dated Jul. 8, 2014.

International Search Report and Written Opinion of the International Searching Authority from International Application No. PCT/US2014/061254, pp. 1-29, dated Jan. 8, 2015.

International Search Report and Written Opinion of the International Searching Authority from International Application No. PCT/US2014/061248, pp. 1-11, dated Jan. 13, 2015.

International Search Report and Written Opinion of the International Searching Authority from International Application No. PCT/US2014/061258, pp. 1-14, dated Jan. 13, 2015.

International Search Report and Written Opinion of the International Searching Authority from International Application No. PCT/US2014/061257, pp. 1-12, dated Jan. 14, 2015.

International Search Report and Written Opinion of the International Searching Authority from International Application No. PCT/US2014/062306, pp. 1-12, dated Jan. 26, 2015.

International Search Report and Written Opinion of the International Searching Authority from International Application No. PCT/US2014/063601, pp. 1-12, dated Jan. 27, 2015.

International Search Report and Written Opinion of the International Searching Authority from International Application No. PCT/US2014/072907, pp. 1-11, dated Mar. 27, 2015.

International Search Report and Written Opinion of the International Searching Authority from International Application No. PCT/US2015/016987, pp. 1-7, dated Jul. 2, 2015.

* cited by examiner

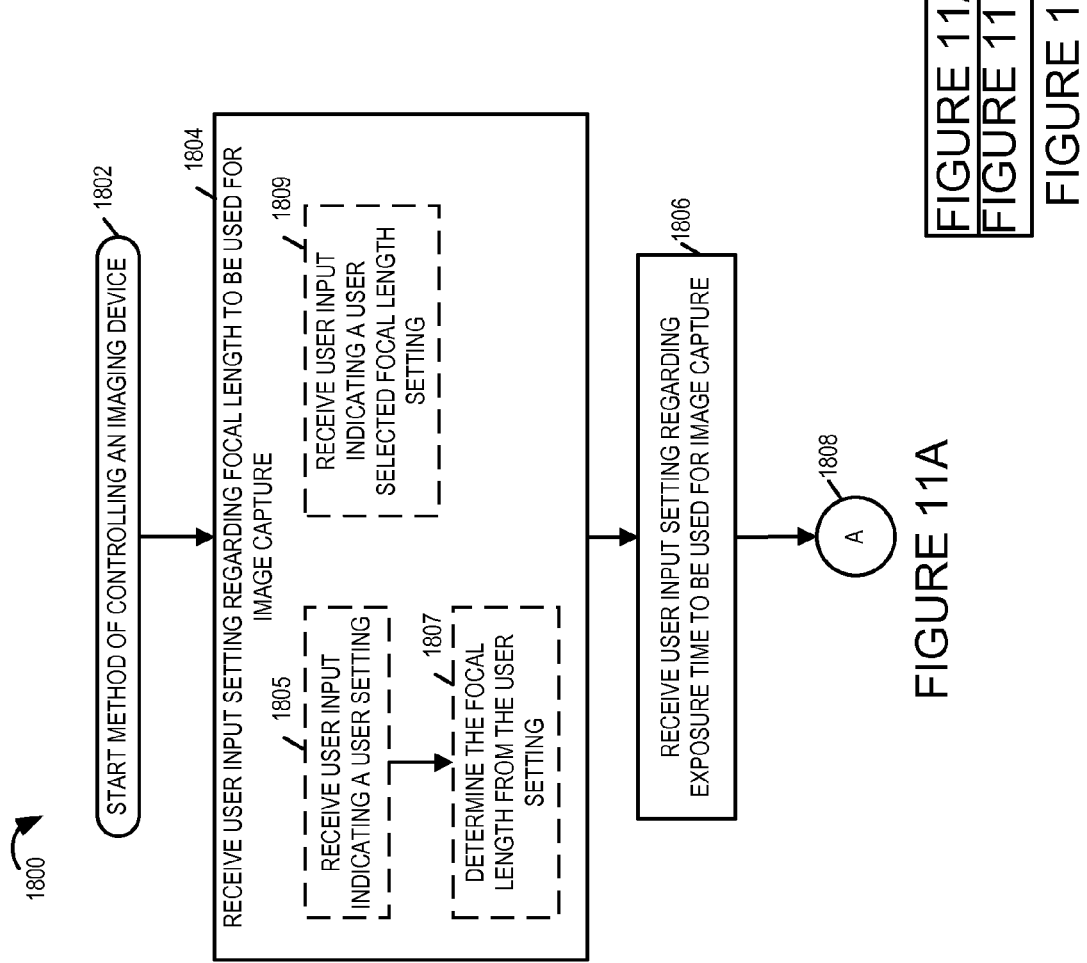

LIGHTING METHODS AND APPARATUS

RELATED APPLICATIONS

The present application claims the benefit of U.S. Provisional Patent Application Ser. No. 61/943,302 filed on Feb. 21, 2014 and the benefit of U.S. Provisional Patent Application Ser. No. 62/099,227 filed on Jan. 2, 2015 each of which is hereby expressly incorporated by reference in its entirety.

FIELD

The present invention relates to illumination methods and apparatus and, more particularly, to the illumination devices and methods which are suitable for use with photographic devices such as still and/or video camera devices.

BACKGROUND

Film cameras often use flash devices which output a very bright light for a very short period of time. A strobe light implemented using a xenon gas discharge tube is an example of a type of flash device that might be used with a conventional film camera. In the case of film cameras, the entire film area is normally exposed at the same time and thus a relatively short burst of light is well suited for lighting an image area being captured when film is used as the light sensing material.

Advances in electrical sensors such as CCD (charge-coupled devices) devices capable of sensing received light and converting light captured over a period of time into an electrical value have resulted in digital cameras replacing film cameras in a wide range of applications. Currently, digital cameras are being used in many still and video applications where film cameras were previously used.

While high resolution sensors are becoming common place in digital cameras, sensors used in digital cameras suffer some drawbacks which are not encountered in the case of film cameras. One particular disadvantage is that it is usually not possible to read out the output of all the pixel elements of a sensor at the same time. To address this problem many digital cameras use what is known as a rolling shutter.

Rolling shutters may be implemented as physical shutters which expose different portions of a piece of film or sensor sequentially or electrically. Physical rolling shutters block light from reaching different portions of the sensor at different times with portions of the sensor being exposed in a sequential or "rolling" manner often with a sensor portion corresponding to the top of an image being exposed first with the exposure then moving toward the bottom portion of the image.

In the case of use of an electronic rolling shutter the requirement for a mechanical shutter is avoided and the rolling shutter is implemented through electronic control of the sensor being used. Because electronic rolling shutters avoid the need for moving mechanical parts associated with mechanical shutters, they are often preferred in digital cameras for cost and reliability reasons.

In the case of an electronic rolling shutter, different portions of a sensor are read out sequentially. Prior to the point in time that the data is to be read out from an individual portion of a sensor, the sensor elements which provide individual pixel values, associated with the portion of the sensor that are to be read out are normally reset and electrical charge due to light exposure is then accumulated for the desired exposure time. The reset normally occurs at a point in time which precedes the read out time by an amount of time equal to the desired exposure. In this way, the duration of exposure is controlled despite the fact there is no physical shutter blocking light from reaching the sensor. At the end of the exposure time, the pixel elements of the sensor which are to be read out are read. The reading of the next portion of the sensor will then proceed in a similar fashion until all the pixel elements of the sensor have been read out providing a complete set of pixel values corresponding to an area whose image is being captured by said sensor.

While a single image is generated from the readout of the pixel elements of a sensor, it should be appreciated that when a rolling shutter is used different portions of the image, e.g., frame, will actually have been captured and correspond to different points in time. It should also be appreciated that in the case where a rolling shutter is used the amount of time used to capture the image will in many cases exceed the exposure time.

Since light is being captured by different portions of a sensor over a period of time which is longer than the exposure time in the case of digital cameras using a rolling shutter, strobe type flashes are normally not used since the duration of such a flash is often less than the time period required to capture a complete image.

In digital cameras, LED (Light Emitting Diode) or other light sources which can be kept in continuous operation for an extended period of time are often used to illuminate an area as an image of the area is captured. The ability to keep a LED light source active for extended periods of time allows for illumination of an area during the full time period in which an image of the area is captured. However, such continuous illumination of an area can be energy intensive given that the LED is normally powered for the full period of time in which the image is being captured even though only a small portion of the sensor is being used for light capture during any given time period.

In view of the above discussion, it should be appreciated that there is a need for improved illumination methods and apparatus. It is desirable but not necessary that some methods and/or apparatus be well suited for use with digital cameras. IT would be desirable if some but not necessarily all embodiments support energy efficient illumination, e.g., which are more efficient than conventional approaches which fully illuminate an object area for the full time period in which image capture by a sensor is occurring.

SUMMARY

Lighting methods and apparatus which are well suited for use with camera devices are described. At least some embodiments are well suited for use with camera devices that include rolling shutters. The methods and apparatus are particularly well suited for use with digital cameras which use a rolling shutter.

In various exemplary embodiments a plurality of lighting elements are provided and used for lighting purposes during image capture. The lighting elements may be LEDs or other light emitting sources. In at least some embodiments the light emitting elements are arranged in an array, e.g., an array extending along the camera body in the direction the rolling shutter will sequentially control read out of the sensor.

The lighting elements are controlled as a function of the exposure time being used and the rolling shutter being implemented. One or more lighting elements are activated at different times, e.g., in a manner synchronized with operation of the rolling shutter. The one or more lighting elements which are activated illuminate the portion of the object/scene area which is having its image captured so that the portion is illuminated during the time period in which the sensor is exposed to capture the corresponding portion of the area. Light emitters corresponding to areas which are not being captured at particular points in time due to use of the rolling shutter are not active and left off. In this manner, energy is used for lighting portions of an area as they are sensed by the sensor for image capture purposes but not for the full period of time.

The sequential lighting of different areas of a scene allows for more efficient use of energy for lighting purposes as compared to fully lighting an entire area in a uniform and consistent manner for the full period of time in which an image is captured.

A variety of lighting configurations are possible. One or more vertical arrays of LEDs are used in some embodiments. The LEDs are arranged so that then can be activated in a sequential synchronized manner corresponding to the sensor readout implemented as the rolling shutter progresses from, in some embodiments, top to bottom.

In some embodiments multiple columns of LEDs are used. LEDs may be covered with a lens designed to provide light in a manner consistent with an effective focal distance which can be selected by a user. In some embodiments the array of LEDs used for a particular focal distance is selected from among a plurality of arrays of LEDs where each array of LEDs may correspond to use of a lens with a different focal distance. In this way, light can be focused so that it illuminates the area which will be captured by the image sensor that is provided with light via an optical chain having a similar focal length to that of the lens used with the LED or set of LEDs which will be used to illuminate an area as an image is captured.

While use of lens on the light emitting devices can help to focus the light on the particular image area to be captured, it should be appreciated that the synchronized illumination methods and apparatus described herein are not limited to embodiments which use lenses over the light emitting elements.

An exemplary lighting device, in accordance with various embodiments, includes: a first lighting module, the first lighting module including a light source; a collimating lens positioned in front of said light source and for generating a beam of light from light output by said light source; and at least a first beam flattening lens for flattening the beam of light in at least a first direction as it passes through the first beam flattening lens. A exemplary method of controlling a lighting device, in accordance with some embodiments, includes: determining which portion of a scene area is to be captured by an image sensor during an image sensor capture time interval; and controlling, as a function of the scene area to be captured, light from the lighting device to be directed to the determined portion of the scene area to be to be captured, said lighting device including at least one of a plurality of lighting modules, different lighting modules corresponding to different scene areas, or a mirror for redirecting a light beam output from said lighting module.

Numerous variations on the above described methods and apparatus are possible and will be apparent in view of the figures, description and claims included in the present application.

BRIEF DESCRIPTION OF THE FIGURES

FIG. 11A illustrates a first part of a flowchart showing the steps of an exemplary method of controlling an imaging device in accordance with an exemplary embodiment of the invention.

DETAILED DESCRIPTION

Figure 1A:
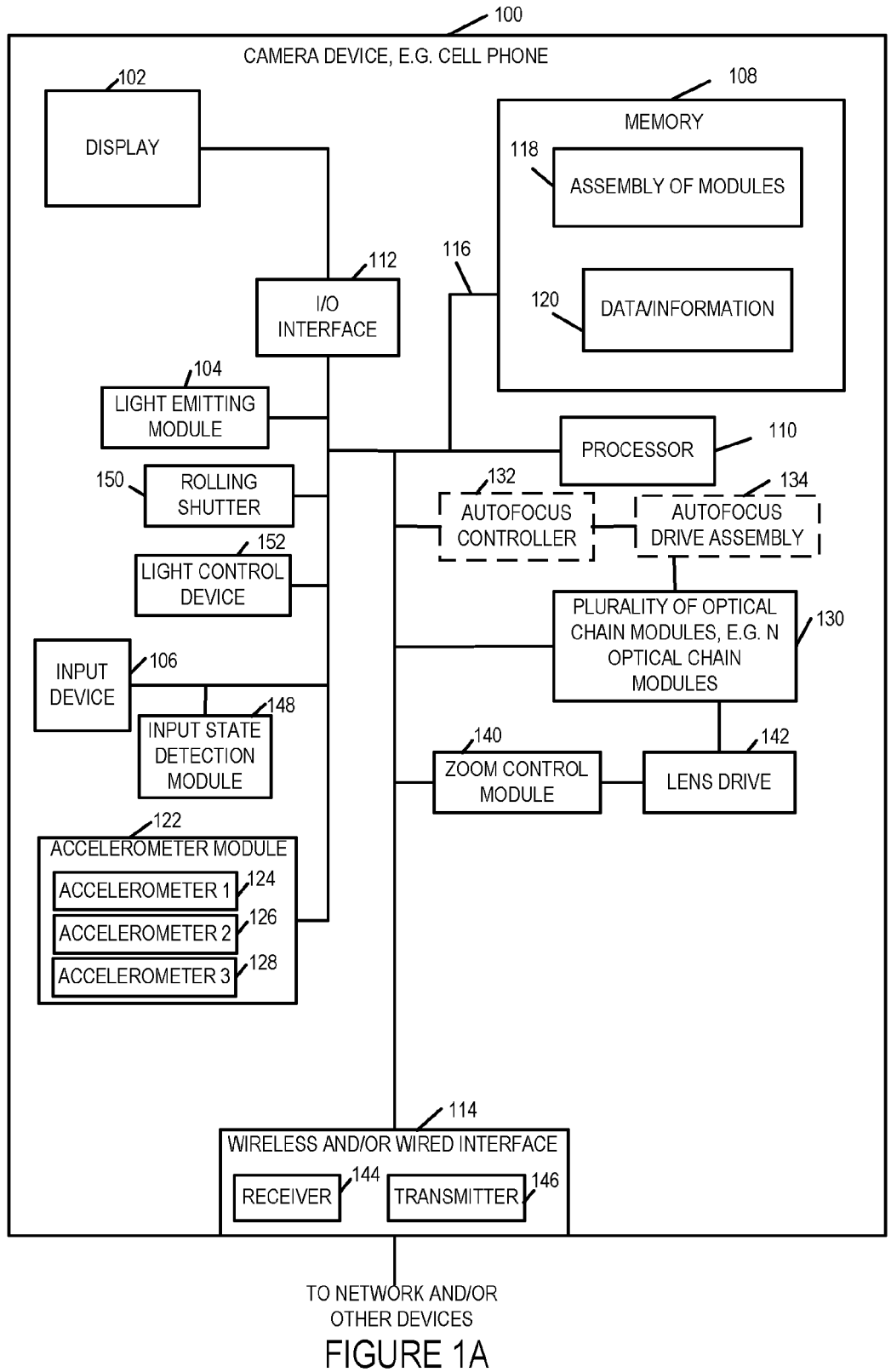
FIG. 1A is an exemplary block diagram of an exemplary apparatus, e.g., camera device, implemented in accordance with one embodiment of the present invention.

FIG. 1A illustrates an exemplary apparatus 100, sometimes referred to hereinafter as a camera device, implemented in accordance with one exemplary embodiment of the present invention. The camera device 100, in some embodiments, is a portable device, e.g., a cell phone or tablet including a camera assembly. In other embodiments, it is fixed device such as a wall mounted camera.

FIG. 1A illustrates the camera device 100 in block diagram form showing the connections between various elements of the apparatus 100. The exemplary camera device 100 includes a display device 102, a light emitter module 104, an input device 106, an input state detection module 148, a rolling shutter 150, a light control device 152, memory 108, a processor 110, a wireless and/or wired interface 114, e.g., a cellular interface, a WIFI interface, or a USB interface, an I/O interface 112, an accelerometer module 122, and a bus 116 which are mounted in a housing represented by the rectangular box touched by the line leading to reference number 100. The light emitter module 104 includes light emitting elements which maybe LEDs (Light Emitting Diodes) or other types of light emitting elements which can be individually controlled so that all the light emitting elements need not be on at the same time. The light emitting module 104 may, and in some embodiments is, a lighting device including multiple lighting modules of the type shown in FIG. 13 or the type shown in any of the other figures of this application. Thus the light emitting module 104, e.g., lighting assembly, maybe and sometime does include one or more lighting modules 2202. As discussed below, each lighting module includes, in some embodiments, a light emitting device, e.g., element, such as an LED or bulb, and one or more lenses. The input device 106 may be, and in some embodiments is, e.g., keypad, touch screen, or similar device that may be used for inputting information, data and/or instructions. The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis. The output of the accelerometer module 122 can, and in some embodiments is, monitored with changes in accelerometer output being interpreted and checked over time by processor 110 and/or zoom control module to detect changes in acceleration indicating motion in one or more directions. In some embodiments the input device 106 includes at least one zoom control button that can be used to enable or disable camera zoom functionality. In some embodiments when the zoom control button is in a depressed state the camera zoom function is enabled while when the button is in a undepressed state the camera zoom function is disabled. The input state detection module 148 is configured to detect the state of the input device, e.g., the zoom control button, to detect whether the button is in a depressed state or undepressed state. In some embodiments there is status register in the camera device 100 that includes a bit indicating the state of the zoom control button detected by the state detection module 148, e.g., whether it is in the depressed state indicating that zoom is enabled or whether it is undepressed indicating that zoom is disabled.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116. In addition to being coupled to the I/O interface 112, the bus 116 is coupled to the memory 108, processor 110, an optional autofocus controller 132, the wireless and/or wired interface 114, a zoom control module 140, and a plurality of optical chain modules 130, e.g., N optical chain modules. In some embodiments N is an integer greater than 2, e.g., 3, 4, 7 or a larger value depending on the particular embodiment. Images captured by individual optical chain modules in the plurality of optical chain modules 130 can be stored in memory 108, e.g., as part of the data/information 120 and processed by the processor 110, e.g., to generate one or more composite images. Multiple captured images and/or composite images may be processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The lighting module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are uses as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation. Light emitting elements are illuminated, in some embodiments, sequentially, so that different portions of an area are illuminated at different times so that the full area need not be consistently lighted during image capture. While all lighting elements are normally not kept on for the full duration of an image capture operation involving the reading out of the full set of pixel elements of a sensor, the portion of area which is having its image captured at a given time as a result of the use of a rolling shutter will be illuminated thanks to synchronization of the lighting of light emitting elements with trolling shutter operation. Thus, with various light emitting elements are controlled to illuminate at different times in some embodiments based on the exposure time and which portion of a sensor will be used to capture a portion of an image at a given time. In some embodiments the light emitting elements in the LED module 104 include a plurality of sets of light emitting elements, each set of light emitting elements corresponding to a different image area which is captured by a different portion of the image sensor. Lenses may, and in some embodiments are used to direct the light to the area which will be captured by the camera through the use of one or more optical chain module with lenses. In at least some embodiments the lenses used for lighting are matched or selected based on the focal length of the optical chain being used at a particular point in time.

The rolling shutter 150 is an electronic shutter that controls reading out of different portions of an image sensor at different times. While an electronic rolling shutter is used in most of the embodiments, a mechanical rolling shutter may still be used in some embodiments.

The light control device 152 is configured to control light emitting elements (e.g., included in the LED module 104) in a synchronized manner with the operation of the rolling shutter 150. In some embodiments the light control device 152 is configured to control different sets of light emitting elements in the array to emit light at different times in a manner that is synchronized with the timing of the rolling shutter 150. In some embodiments the light control device 152 is configured to control a first set of light emitting elements corresponding to a first image area to output light during a first time period, the first time period being determined based on the timing of the rolling shutter and being a period of time during which a first portion of the sensor is exposed for image capture. In some embodiments the light control device 152 is further configured to control a second set of light emitting elements corresponding to a second image area to output light during a second time period, the second time period being determined based on the timing of the rolling shutter and being a period of time during which a second portion of the sensor is exposed for image capture. In some embodiments the time first time period includes at least a portion of time which does not overlap the second time period.

In some embodiments the light control device 152 is further configured to control an Nth set of light emitting elements corresponding to an Nth image area to output light during a third time period, said Nth time period being determined based on the timing of the rolling shutter and being a period of time during which an Nth portion of the sensor is exposed for image capture, N being an integer value corresponding to the total number of time periods used by said rolling shutter to complete one full read out of said image sensor.

In some embodiments the light control device 152 is further configured to the second set of light emitting elements to be off during said portion of time in included in the first period of time which does not overlap said second period of time. In some embodiments the light control device is configured to determine when the first set and said second set of light emitting elements are to be on based on an exposure setting. In some embodiments the light control device is configured to determine when said first set and said second set of light emitting elements are to be on based on an amount of time between read outs of different portions of said sensor. In some embodiments the different sets of light emitting elements in the plurality of light emitting elements are covered with different lenses. In some such embodiments light control device is further configured to determine which sets of light emitting elements to use based on an effective focal length setting being used by the camera device.

The accelerometer module 122 includes a plurality of accelerometer including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. The camera acceleration detected by an accelerometer in a given direction is monitored. Acceleration and/or changes in acceleration, indicative of camera motion, are monitored and processed to detect one or more directions, e.g., forward camera motion, backward camera motion, etc. As discussed below, the acceleration indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus controller 132 is present in at least some autofocus embodiments but would be omitted in fixed focus embodiments. The autofocus controller 132 controls adjustment of at least one lens position in the optical chain modules used to achieve a desired, e.g., user indicated, focus. In the case where individual drive assemblies are included in each optical chain module, the autofocus controller 132 may drive the autofocus drive of various optical chain modules to focus on the same target. As will be discussed further below, in some embodiments lenses for multiple optical chain modules are mounted on a single platter which may be moved allowing all the lenses on the platter to be moved by adjusting the position of the lens platter. In some such embodiments the autofocus drive assembly 134 is included as an element that is external to the individual optical chain modules with the drive assembly 134 driving the platter including the lenses for multiple optical chains under control of the autofocus controller 132. While the optical chain modules will in many embodiments be focused together to focus on an object at a particular distance from the camera device 100, it is possible for different optical chain modules to be focused to different distances and in some embodiments different focus points are intentionally used for different optical chains to increase the post processing options which are available.

The zoom control module 140 is configured to perform a zoom operation as a function of detected camera acceleration. In some embodiments the camera acceleration indicative of one of a forward camera motion or a backward camera motion is used to control zoom operations. Thus in some embodiments the zoom control module 140 performs a zoom operation by controlling a direction of zoom based on whether the detected acceleration is indicative of a forward or backward camera motion. In some embodiments the zoom control module 140 performs a zoom in operation when the detected acceleration is indicative of a forward camera motion. In some embodiments the zoom control module 140 performs a zoom out operation when the detected acceleration is indicative of a backward camera motion. In some embodiments the zoom control module is configured to detect the state of a user input device, e.g., zoom control button, to determine if a zoom function is enabled, prior to performing a zoom operation and perform the zooming operation as a function of the detected camera acceleration when the state of the user input device indicates zoom operation is enabled but not when the state of the user input device indicates that the zoom operation is not enabled.

In some embodiments the zoom control module 140 control adjustment of at least one lens position in the optical chain modules used to achieve a desired, e.g., user desired, zoom. In some embodiments this is performed by the zoom control module 140 by controlling the lens drive (LD) 142 which adjust the position of a lens and/or swaps a first lens with a second lens by moving a platter with multiple lenses to implement the zooming operation. In some embodiments where a plurality of lens drives are used with each lens drive corresponding to a different optical chain, the zoom control module 140 controls the lens drive of various optical chain modules to adjust, e.g., move and/or shift, a lens position in the corresponding optical chain. In some embodiments the lens drive 142 is included as an element that is external to the individual optical chain modules with the lens drive assembly 142 driving a platter including multiple lenses corresponding to multiple optical chains under control of the zoom control module 140. In some such embodiments the LD 142 is responsive to the zoom control module 140 which operates in response to detected camera acceleration and can move a platter including multiple lenses vertically, horizontally or in some combination of vertical and horizontal motion to implement a lens change operation. The lens drive 142 may be implemented with a motor and mechanical linkage to the platter including the lenses. In some embodiments, the lens drive 142 may also rotate the platter to support changes. The rotation may be an off center rotation and/or may be performed in combination with one or more other platter position changes.

In some embodiments the zoom control module 140 serves as a focal length determination module to determine the focal length from a user setting, e.g., a focal length set by a user of the camera via a zoom control input. A change in zoom in some embodiments is achieved by moving one or more lenses outward towards the front of the camera to increase the zoom and towards the back of the camera to decrease the zoom and allow a larger image area to be captured. In other embodiments a change in one or more lenses is used to implement a zoom operation. While various methods and apparatus for implementing a zoom change have been described, the zoom control interface described herein can be used with a wide range of zoom mechanisms and is not limited to implementing a zoom operation in a particular way.

The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1A, various features relating to the plurality of optical chain modules 130 will now be discussed with reference to FIGS. 1B and 1C which show the camera device 100 from front and side perspectives, respectively. Dashed line 101 of FIG. 1B indicates a cross section line corresponding to the FIG. 1C view.

Box 117 represents a key and indicates that OCM=optical chain module and each L1 represents an outermost lens in an optical chain module. Box 119 represents a key and indicates that S=sensor, F=filter, L=lens, L1 represents an outermost lens in an optical chain module, and L2 represents an inner lens in an optical chain module.

Figure 1B:
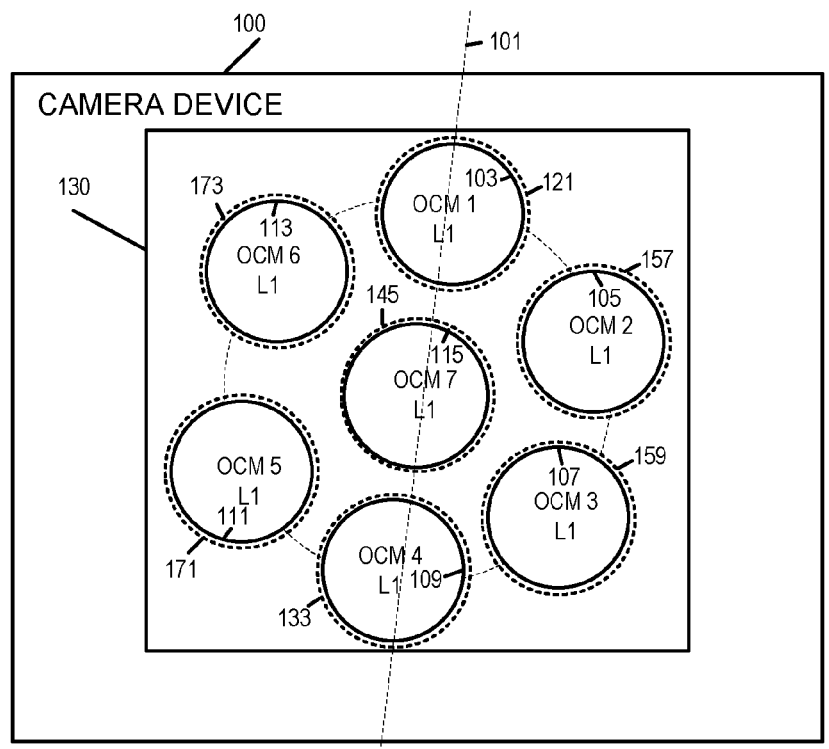
FIG. 1B illustrates a frontal view of an apparatus implemented in accordance with an exemplary embodiment which incorporates multiple optical chain modules in accordance with the present invention with lenses which are viewable from the front of the camera.

FIG. 1B shows the front of the camera device 100. Rays of light 131, which is light toward the front of the camera assembly, shown in FIG. 1C may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chain modules 130 is mounted.

Figure 1C:
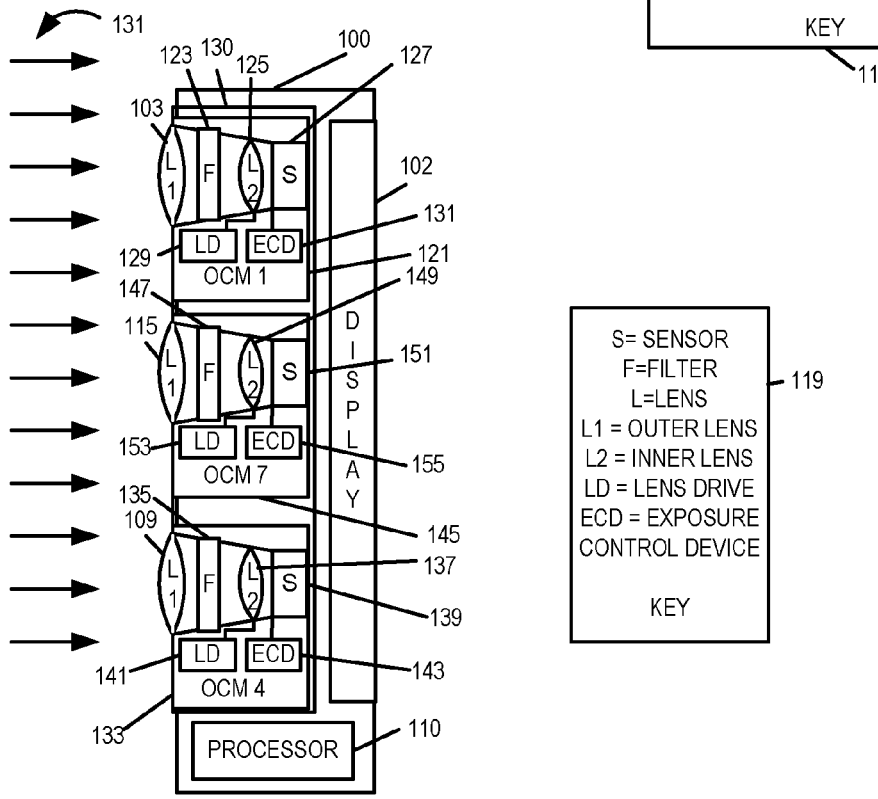
FIG. 1C, which is a side view of the exemplary apparatus of FIG. 1B, illustrates further details of the exemplary apparatus.

FIG. 1C, which shows a side perspective of camera device 100, illustrates three of the seven optical chain modules (OCM 1 121, OCM 7 145, OCM 4 133) of the set of optical chain modules 130, display 102 and processor 110. OCM 1 121 includes an outer lens L1 103, a filter 123, an inner lens L2 125, and a sensor 127. In some embodiments the OCM 1 121 further includes lens drive (LD) 129 for controlling the position of lens L2 125 for zooming operation purposes, and an exposure control device (ECD) 131 for controlling sensor 127. The LD 129 includes a motor or other drive mechanism which can move the lens (or sensor) to which it is connected. While the LD 129 is shown coupled, e.g., connected, to the lens L2 125 and thus can move the position of the lens L2, e.g., as part of a zooming operation, in other embodiments the LD 129 is coupled to the sensor 127 and moves the position of the sensor 127, e.g., to change the distance between the sensor 127 and the lens 125 as part of a zooming and/or focus operation. OCM 7 145 includes an outer lens L1 115, a filter 147, an inner lens L2 149, and a sensor 151. OCM 7 145 further includes LD 153 for controlling the position of lens L2 149 and ECD 155 for controlling sensor 151.

OCM 4 133 includes an outer lens L1 109, a filter 135, an inner lens L2 137, and a sensor 139. The LD 153 includes a motor or other drive mechanism which can move the lens (or sensor) to which it is connected. While the LD 153 is shown coupled, e.g., connected, to the lens L2 149 and thus can move the position of the lens L2 as part of a focus operation, in other embodiments the LD 149 is coupled to the sensor 151 and moves the position of the sensor 151, e.g., to change the distance between the sensor 151 and the lens 149 as part of a zooming and/or focus operation.

OCM 4 133 further includes LD 141 for controlling the position of lens L2 137 and ECD 143 for controlling sensor 139. The LD 141 includes a motor or other drive mechanism which can move the lens (or sensor) to which it is connected. While the LD 141 is shown coupled, e.g., connected, to the lens L2 137 and thus can move the position of the lens L2 as part of a zooming and/or focus operation, in other embodiments the LD 141 is coupled to the sensor 139 and moves the position of the sensor 139, e.g., to change the distance between the sensor 139 and the lens 137 as part of a zooming operation.

While only three of the OCMs are shown in FIG. 1C it should be appreciated that the other OCMS of the camera device 100 may, and in some embodiments do, have the same or similar structure.

FIG. 1C and the optical chain modules (OCMs), also sometimes referred to as optical camera modules, illustrated therein are illustrative of the general structure of OCMs used in various embodiments. However, numerous modifications and particular configurations are possible. Many of the particular configurations will be discussed below with use of reference to the optical camera modules shown in FIG. 1C. While reference to elements of FIG. 1C may be made, it is to be understood that the OCMs in a particular embodiment will be configured as described with regard to the particular embodiment. Thus, for example, the filter may be of a particular color. Similarly, in embodiments where the filter is expressly omitted and described as being omitted or an element which allows all light to pass, while reference may be made to the OCMs of FIG. 1C, it should be appreciated that the filter will be omitted in an embodiment where it is indicated to be omitted or of such a nature that it passes a broad spectrum of light to pass if the embodiment is indicated to have a broadband filter. As will be discussed below, the elements of the different OCMs may, but need not be, mounted on a common support device, e.g., disc or platter, allowing a set of filters, lenses or sensors of the different optical chains to be moved as a set. While in the OCMs of FIG. 1C mirrors are not shown, as will be discussed below, in at least some embodiments one or more mirrors are added to the OCMs to all light to be directed, e.g., to increase the length of the optical path or make for a more convenient internal component configuration. It should be appreciated that each of the OCMS 121, 145, 133, shown in FIG. 1C will have their own optical axis which corresponds to the path light entering the particular OCM will follow as it passes from the lens 103, 115, or 109 at the front of the optical chain and passes through the OCM to the corresponding sensor 127, 151, 139.

While the processor 110 is not shown being coupled to the LD, ECD and sensors 127, 151, 139 it is to be appreciated that such connections exist and are omitted from FIG. 1C to facilitate the illustration of the configuration of the exemplary OCMs.

As should be appreciated the number and arrangement of lens, filters and/or mirrors can vary depending on the particular embodiment and the arrangement shown in FIG. 1C is intended to be exemplary and to facilitate an understanding of the invention rather than limiting in nature.

The front of the plurality of optical chain modules 130 is visible in FIG. 1B with the outermost lens of each optical chain module appearing as a circle represented using a solid line (OCM 1 L1 103, OCM 2 L1 105, OCM 3 L1 107, OCM 4 L1 109, OCM 5 L1 111, OCM 6 L1 113, OCM 7 L1 115). In the FIG. 1B example, the plurality of optical chain modules 130 include seven optical chain modules, OCM 1 121, OCM 2 157, OCM 3 159, OCM 4 133, OCM 5 171, OCM 6 173, OCM 7 145, which include lenses (OCM 1 L1 103, OCM 2 L1 105, OCM 3 L1 107, OCM 4 L1 109, OCM 5 L1 111, OCM 6 L1 113, OCM 7 L1 115), respectively, represented by the solid circles shown in FIG. 1B. The lenses of the optical chain modules are arranged to form a pattern which is generally circular in the FIG. 1B example when viewed as a unit from the front. While a circular arrangement is preferred in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

Note that the individual outer lenses, in combination, occupy an area that might otherwise have been occupied by a single large lens. Thus, the overall total light capture area corresponding to the multiple lenses of the plurality of chain modules OCM 1 to OCM 7, also sometimes referred to as optical camera modules, approximates that of a lens having a much larger opening but without requiring a single lens having the thickness which would normally be necessitated by the curvature of a single lens occupying the area which the lenses shown in FIG. 1B occupy.

While gaps are shown between the lens openings of the optical chain modules OCM 1 to OCM 7, it should be appreciated that the lenses may be made, and in some embodiments are, made so that they closely fit together minimizing gaps between the lenses represented by the circles formed by solid lines. While seven optical chain modules are shown in FIG. 1B, it should be appreciated that other numbers of optical chain modules are possible.

As will be discussed below, the use of seven optical chain modules provides a wide degree of flexibility in terms of the types of filter combinations and exposure times that can be used for different colors while still providing an optical camera module that can be used to provide an image for purposes of user preview of the image area and selection of a desired focal distance, e.g., by selecting an object in the preview image which is to be the object where the camera modules are to be focused.

For example, in some embodiments, at least some of the different optical chain modules include filters corresponding to a single color thereby allowing capture of a single color at the full resolution of the image sensor, e.g., the sensor does not include a Bayer filter. In one embodiment two optical chain modules are dedicated to capturing red light, two optical chain modules are dedicated to capturing green light and two optical chain modules are dedicated to capturing blue light. The center optical chain module may include a RGB filter or opening which passes all colors with different portions of the sensor of the center optical chain module being covered by different color filters, e.g., a Bayer pattern with the optical chain module being used to capture all three colors making it easy to generate color preview images without having to process the output of multiple optical chain modules to generate a preview image.

The use of multiple optical chains such as shown in the FIG. 1A-1C embodiment has several advantages over the use of a single optical chain. Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

As should be appreciated, different wavelengths of light will be bent by different amounts by the same lens. This is because the refractive index of glass (or plastic) which the lens is made of changes with wavelength. Dedication of individual optical chains to a particular color allows for the lenses for those optical chains to be designed taking into consideration the refractive index of the specific range of wavelength for that color of light. This can reduce chromatic aberration and simplify lens design. Having multiple optical chains per color also has the advantage of allowing for different exposure times for different optical chains corresponding to a different color. Thus, as will be discussed further below, a greater dynamic range in terms of light intensity can be covered by having different optical chains use different exposure times and then combining the result to form the composite image, e.g., by weighting the pixel values output by the sensors of different optical chains as a function of exposure time when combing the sensed pixel values to generate a composite pixel value for use in a composite image. Given the small size of the optical sensors (pixels) the dynamic range, in terms of light sensitivity, is limited with the sensors becoming easily saturated under bright conditions. By using multiple optical chains corresponding to different exposure times the dark areas can be sensed by the sensor corresponding to the longer exposure time while the light areas of a scene can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 1C is a cross section perspective of the camera device 100 shown in FIGS. 1A and 1B. Dashed line 101 in FIG. 1B shows the location within the camera device to which the cross section of FIG. 1C corresponds. From the side cross section, the components of the first, seventh and fourth optical chains are visible.

As illustrated in FIG. 1C despite including multiple optical chains the camera device 100 can be implemented as a relatively thin device, e.g., a device less than 2, 3 or 4 centimeters in thickness in at least some embodiments. Thicker devices are also possible, for example devices with telephoto lenses and are within the scope of the invention, but the thinner versions are particularly well suited for cell phones and/or tablet implementations.

As illustrated in the FIG. 1C diagram, the display device 102 may be placed behind the plurality of optical chain modules 130 with the processor 110, memory and other components being positioned, at least in some embodiments, above or below the display and/or optical chain modules 130. As will be discussed below, and as shown in FIG. 1C, each of the optical chains OCM 1 121, OCM 7 145, OCM 4 133 may, and in some embodiments do, include an outer lens L1, an optional filter F, and a second optional lens L2 which proceed a sensor S which captures and measures the intensity of light which passes through the lens L1, filter F and second lens L2 to reach the sensor S. The filter may be a color filter or one of a variety of other types of light filters.

In FIG. 1C, each optical chain module includes a lens drive (LD) also sometimes referred to as an lens drive device which can alter the position of the second lens L2, e.g., move it forward, backward or change the position of the lens otherwise, as part of a zooming and/or focus operation. An exposure control device (ECD) which controls the light exposure time of the sensor to which the ECD corresponds, is also included in each of the OCMs shown in the FIG. 1C embodiment. The LD of each optical chain module operates under the control of the zoom control module 140. The zoom control module 140 while shown as a separate element of the device 100 can be implemented as a module stored in memory and executed by processor 110.

Note that while supporting a relatively large light capture area and offering a large amount of flexibility in terms of color filtering and exposure time, the camera device 100 shown in FIG. 1C is relatively thin with a thickness that is much less, e.g., $1/5$th, $1/10$th, $1/20$th or even less than the overall side to side length or even top to bottom length of the camera device visible in FIG. 1B.

Figure 2:
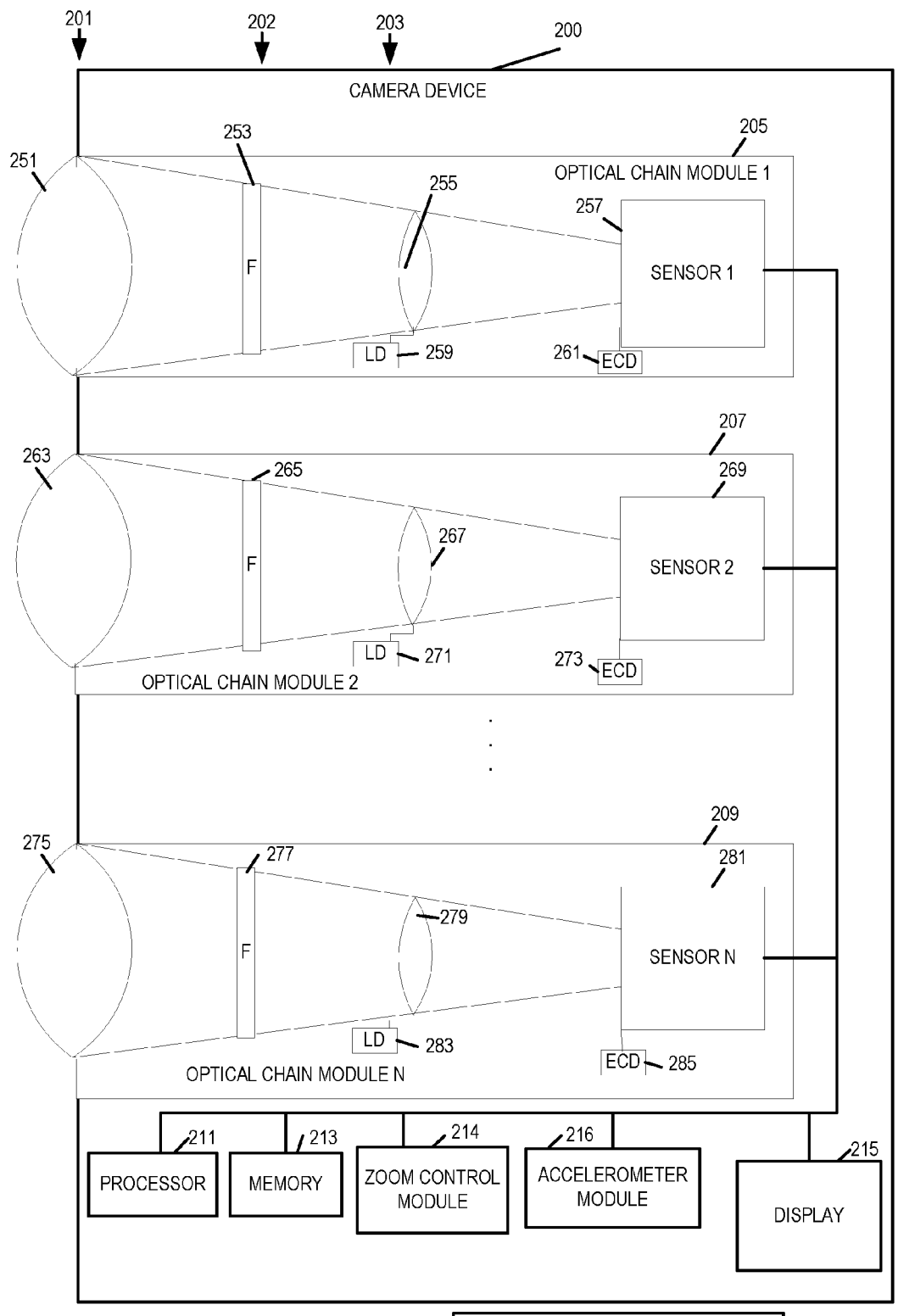
FIG. 2 illustrates a camera device implemented in accordance with one embodiment.

FIG. 2 illustrates a camera device 200 implemented in accordance with the invention. The FIG. 2 camera device 200 includes many or all of the same elements shown in the device 100 of FIGS. 1A-1C. Exemplary camera device 200 includes a plurality of optical chain modules (OCM 1 205, OCM 2 207, . . . , OCM N 209, a processor 211, memory 213 and a display 215, coupled together. OCM 1 205 includes outer lens L1 251, filter 253, inner lens L2 255, sensor 1 257, AFD 259 and ECD 261. In some embodiments, processor 211 of camera device 200 of FIG. 2 is the same as processor 110 of device 100 of FIG. 1A, memory 213 of device 200 of FIG. 2 is the same as memory 108 of device 100 of FIG. 1A, the zoom control module 214 of device 200 is the same as zoom control module 140 of device 100, the accelerometer module 216 of device 200 is the same as accelerometer module 122 of device 100 and display 215 of device 200 of FIG. 2 is the same as display 102 of device 100 of FIG. 1A.

OCM 2 207 includes outer lens L1 263, filter 265, inner lens L2 267, sensor 2 269, AFD 271 and ECD 273. OCM N 209 includes outer lens L1 275, filter 277, inner lens L2 279, sensor N 281, AFD 283 and ECD 285. Box 217, which represents a key, indicates that ECD=exposure control device and LD=lens drive.

In the FIG. 2 embodiment the optical chain modules (optical chain module 1 205, optical chain module 2 207, . . . , optical chain module N 209) are shown as independent assemblies with the lens drive of each module being a separate LD element (LD 259, LD 271, LD 283), respectively. Each of the LDs shown adjusts the position of the corresponding lens to which it is connected as part of a zooming and/or focus operation. In some embodiments the LD controls the position of a lens and/or sensor in which case the LD is connected to both a lens support mechanism or lens and the sensor.

In FIG. 2, the structural relationship between the various lenses and filters which precede the sensor in each optical chain module can be seen more clearly. While three elements, e.g. two lenses (see columns 201 and 203 corresponding to L1 and L2, respectively) and the filter (corresponding to column 202) are shown in FIG. 2 before each sensor, it should be appreciated that a much larger combination of lenses and/or filters may precede the sensor of one or more optical chain modules with anywhere from 2-10 elements being common and an even larger number of elements being used in some embodiments, e.g., high end embodiments and/or embodiments supporting a large number of filter and/or lens options.

In some but not all embodiments, optical chain modules are mounted in the camera device to extend from the front of the camera device towards the back, e.g., with multiple optical chain modules being arranged in parallel. Filters and/or lenses corresponding to different optical chain modules may, and in some embodiments are, arranged in planes extending perpendicular to the front to back direction of the camera device from the bottom of the camera device towards the top of the camera device. While such a mounting arrangement is used in some embodiments, other arrangements where the optical chain modules are arranged at different angles to one another and/or the camera body are possible.

Note that the lenses/filters are arranged in planes or columns in the vertical dimension of the camera device 200 to which reference numbers 201, 202, 203 correspond. The fact that the lenses/filters are aligned along vertical planes allows for a manufacturing and structural simplification that is used in some embodiments. That is, in some embodiments, the lenses and/or filters corresponding to a plane 201, 202, 203 are formed or mounted on a platter or plate. The term platter will be used for discussion purposes but is not intended to be limiting. The platter may take the form of a disc but non-round platters are also contemplated and are well suited for some embodiments. In the case of plastic lenses, the lenses and platter may be molded out of the same material in a single molding operation greatly reducing costs as compared to the need to manufacture and mount separate lenses. As will be discussed further, platter based embodiments allow for relatively simple synchronized focus operations in that a platter may be moved front or back to focus multiple OCMs at the same time. In addition, as will be explained, platters may be moved or rotated, e.g., along a central or non-central axis, to change lenses and or filters corresponding to multiple optical chain modules in a single operation. A single platter may include a combination of lenses and/or filters allowing, e.g., a lens to be replaced with a filter, a filter to be replaced with a lens, a filter or lens to be replaced with an unobstructed opening. As should be appreciated the platter based approach to lens, filter and/or holes allows for a wide range of possible combinations and changes to be made by simple movement of one or more platters. It should also be appreciated that multiple elements may be combined and mounted together on a platter. For example, multiple lenses, filters and/or lens-filter combinations can be assembled and mounted to a platter, e.g., one assembly per optical chain module. The assemblies mounted on the platter for different optical chains may be moved together, e.g., by rotating the platter, moving the platter horizontally or vertically or by moving the platter using some combination of one or more such movements.

While platters have been described as being moved to change elements in an optical chain, they can, and in some embodiments are, moved for image stabilization purposes. For example, a platter having one or more lenses mounted thereon can be moved as part of an image stabilization operation, e.g., to compensate for camera motion.

While mounting of lenses and filters on platters has been discussed, it should also be appreciated that the sensors of multiple optical chains can be mounted on a platter. For example, sensors without color filters may be replaced with sensors with color filters, e.g., Bayer pattern filters. In such an embodiment sensors can be swapped or changed while leaving one or more components of one or more optical chains in place.

Note from a review of FIG. 2 that in some embodiments, e.g., larger focal length telephoto applications, the elements, e.g., filters/lenses closer to the sensor of the optical chain module, are smaller in size than the outer most lenses shown in column 201. As a result of the shrinking size of the lenses/filters, space becomes available between the lenses/filters within the corresponding platter.

Figure 3A:
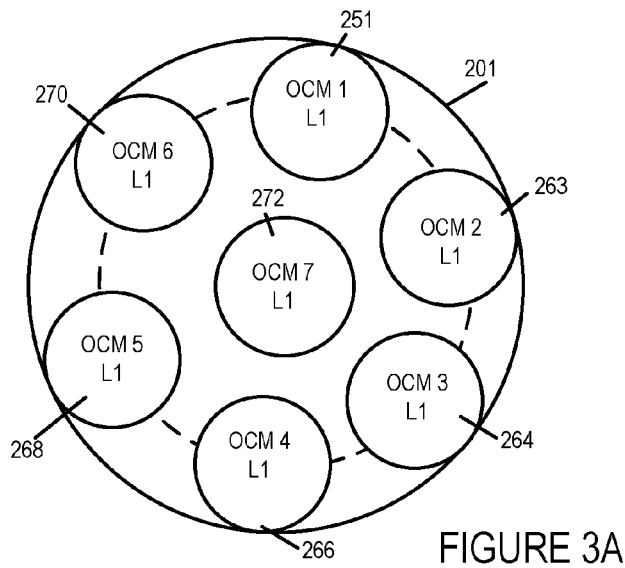
FIG. 3A shows an exemplary lens configuration which may be used for the set of outer lenses of the camera device shown in FIGS. 1A-1C.
Figure 3B:
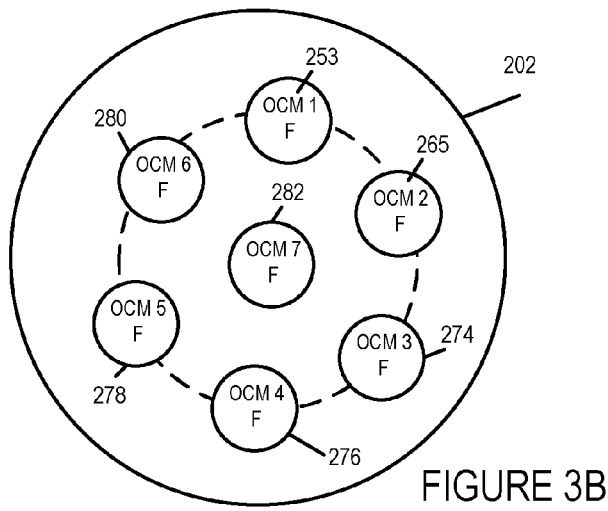
FIG. 3B illustrates an exemplary filter arrangement which is used in the camera of FIGS. 1A-1C in some embodiments.
Figure 3C:
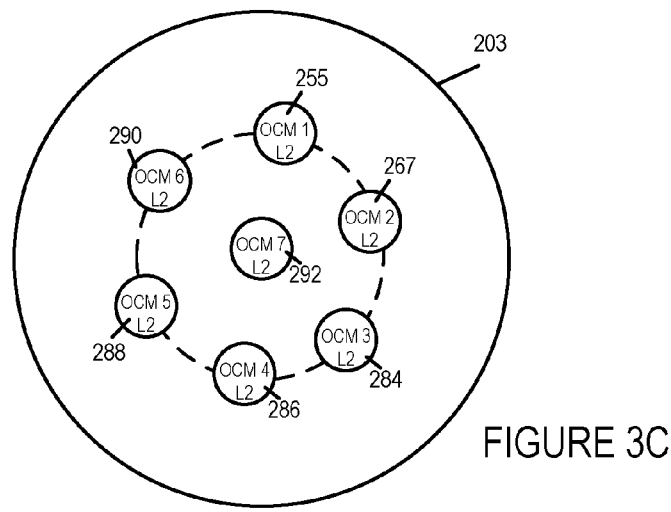
FIG. 3C shows an exemplary inner lens configuration which may, and in some embodiments is, used for a set of inner lenses of the camera device shown in FIGS. 1A-1C.

FIGS. 3A through 3C provide perspective views of the different planes 201, 202, 203 shown in FIG. 2. As shown in FIG. 3A, the outer lenses L1 (OCM 1 L1 251, OCM 2 L1 263, OCM 3 L1 264, OCM 4 L1 266, OCM 5 L1 268, OCM 6 L1 270, OCM 7 L1 272) occupy much of the outer circular area corresponding to the front of the camera modules as previously shown in FIG. 1B. However, as shown in FIG. 3B the filters (OCM 1 F 253, OCM 2 F 265, OCM 3 F 274, OCM 4 F 276, OCM 5 F 278, OCM 6 F 280, OCM 7 F 282) corresponding to plane 202 occupy less space than the lenses shown in FIG. 3A while the inner lenses L2 (OCM 1 L2 255, OCM 2 L2 267, OCM 3 L2 284, OCM 4 L2 286, OCM 5 L2 288, OCM 6 L2 290, OCM 7 L2 292) shown in FIG. 3C occupy even less space. In some embodiments, where N=7, outer lens L1 275, filter F 277, and inner lens L2 279 of FIG.

2 are the same as OCM 7 L1 272 of FIG. 3A, OCM 7 F 282 of FIG. 3B and OCM 7 L2 292 of FIG. 3C, respectively.

The decreasing size of the inner components allow multiple lenses and/or filters to be incorporated into a platter corresponding to one or more of the inner planes. Consider for example that an alternative filter F' or hole could be mounted/drilled below or next two each filter F of a platter corresponding to plan 202 and that by shifting the position or platter vertically, horizontally or a combination of horizontally and vertically, the filter F can be easily and simply replaced with another filter or hole. Similarly the lenses L2 may be replaced by alternative lenses L2' by shifting a platter of lenses corresponding to plane 203. In some embodiments, the platter may also be rotated to support changes. The rotation may be an off center rotation and/or may be performed in combination with one or more other platter position changes.

Figure 4:
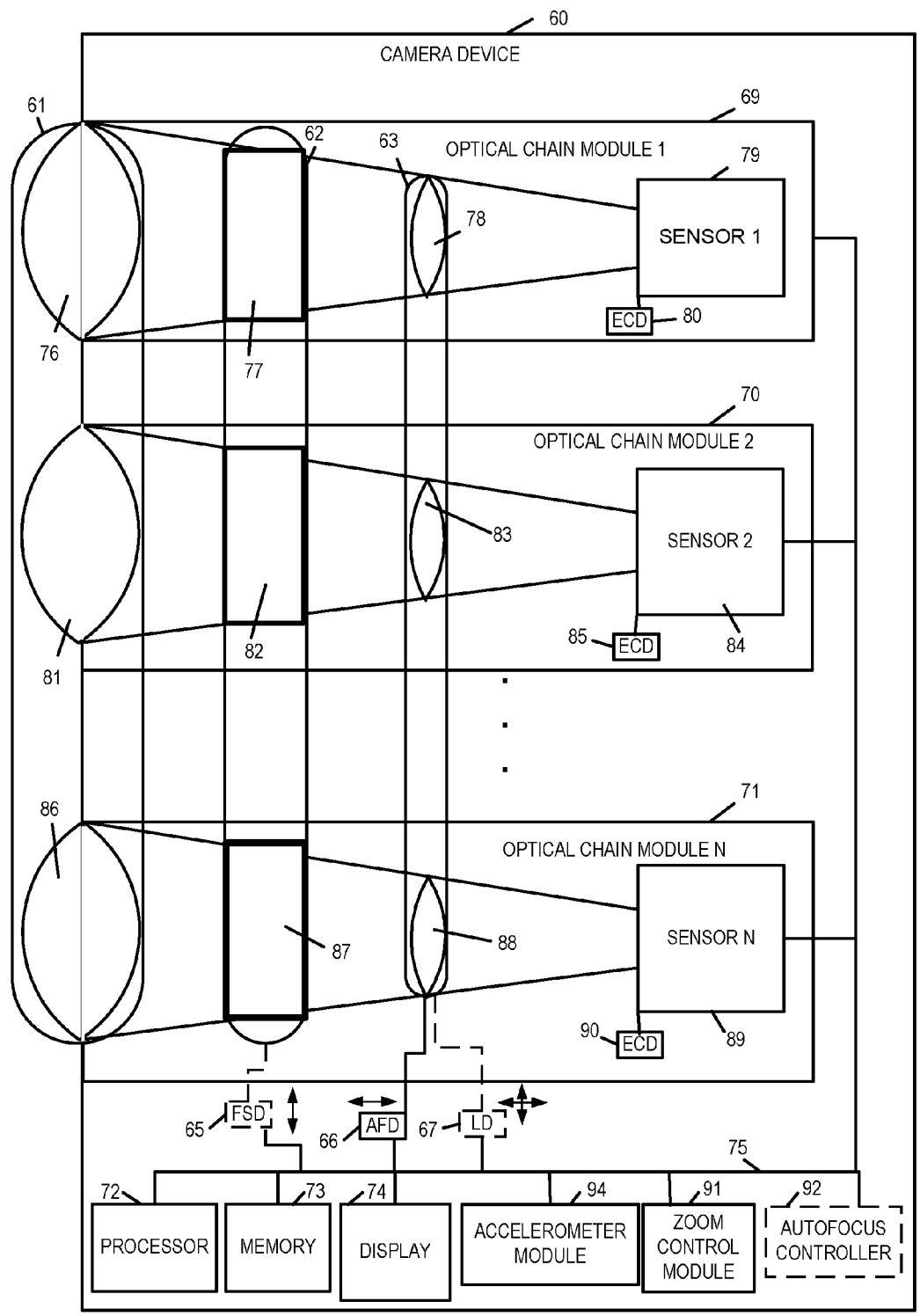
FIG. 4 illustrates an exemplary camera device in which the sets of outer lenses, filters, and inner lenses are mounted on corresponding platters.

A camera device 60 which includes platters of lenses and/or filters (61, 62, 63) is shown in FIG. 4. Camera device 60 includes a plurality of optical chain modules (optical chain module 1 69, optical chain module 2 70, . . . , optical chain module N 71), processor 72, memory 73, and display 74 coupled together via bus 75. In some embodiments, processor 72, memory 73, display 74, accelerometer module 94, zoom control module 91, and autofocus controller 92 of device 60 of FIG. 4 are the same as processor 110, memory 108, display 102, accelerometer module 122, zoom control module 140, and autofocus controller 132 of device 100 of FIG. 1A.

Element 61 represents a platter of outer lenses L1 with 3 of the lenses (77, 81, 86) being shown as in the FIG. 1C example. Additional lenses may be, and often are, included on the platter 61 in addition to the ones shown. For example, in a seven optical chain module embodiment such as shown in FIG. 1, platter 61 would include seven outer lenses. Note that the thickness of the platter 61 need not exceed the maximum thicknesses of the lenses and from a side perspective is much thinner than if a single lens having a similar curvature to that of the individual lenses L1, but with the single lens being larger, occupied the same area as all the 7 lenses on the platter 61. Platter 62 includes the filters F, which include the three filters (77, 82, 87) while platter 63 includes the inner lenses L2, which include the three lenses (78, 83, 88). As can be appreciated the camera device 60 is the same as or similar to the camera device of FIG. 1C and FIG. 2 but with the lenses and filters being mounted on platters which may be moved between the front and back of the camera to support autofocus or horizontally and/or vertically to support lens/filter changes.

Auto focus drive 66 is used to move platter 63 forward or backward as part of a focus operation, e.g., under control of the autofocus controller 76 which may be, and often is, included in the camera device 60. A filter shift drive (FSD) 65 is included in embodiments where shifting of the platter 62 is supported as part of a filter change operation. The FSD 65 is responsive to the processor 72 which operates in response to user selection of a particular mode of operation and/or an automatically selected mode of operation and can move the platter 62 vertically, horizontally or in some combination of vertical and horizontal motion to implement a filter change operation. The FSD 65 may be implemented with a motor and mechanical linkage to the platter 62. In some embodiments, the platter 62 may also be rotated to support changes. The rotation may be an off center rotation and/or may be performed in combination with one or more other platter position changes.

A lens drive (LD) 67 is included in various embodiments where shifting of the platter 63 is supported. The LD 67 works under the control of the zoom control module 91 included in the camera device 60 and can move the platter 63 vertically, horizontally or in some combination of vertical and horizontal motion to implement a lens shifting, adjustment and/or a lens change operation, e.g., as part of a zooming operation. The LD 67 may be implemented with a motor and mechanical linkage to the platter 63. In some embodiments, the platter 63 may also be rotated to support changes. The rotation may be an off center rotation and/or may be performed in combination with one or more other platter position changes.

Figure 5A:
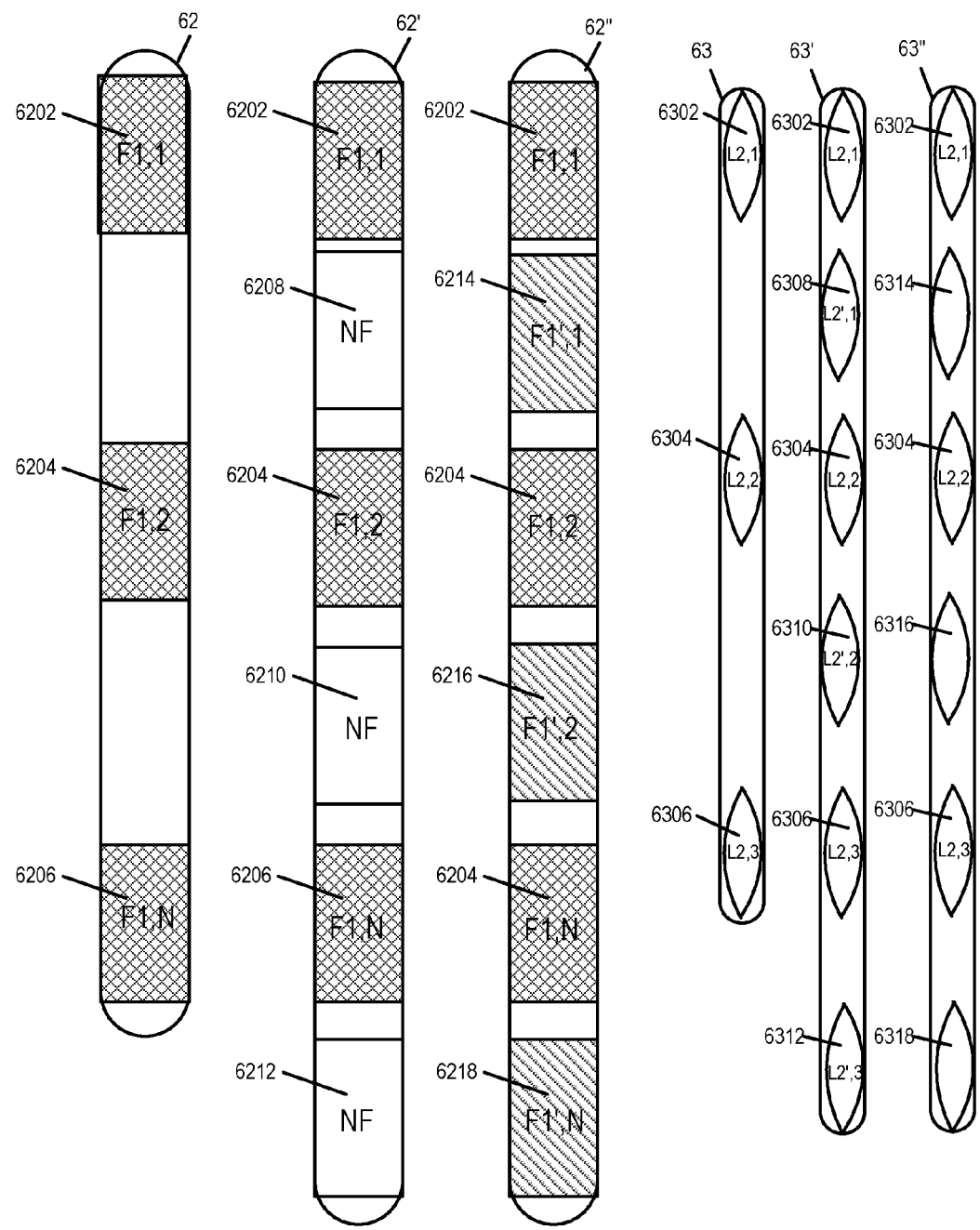
FIG. 5A illustrates various filter and lens platters that may be used in the camera device shown in FIG. 4 depending on the particular embodiment.
Figure 5B:
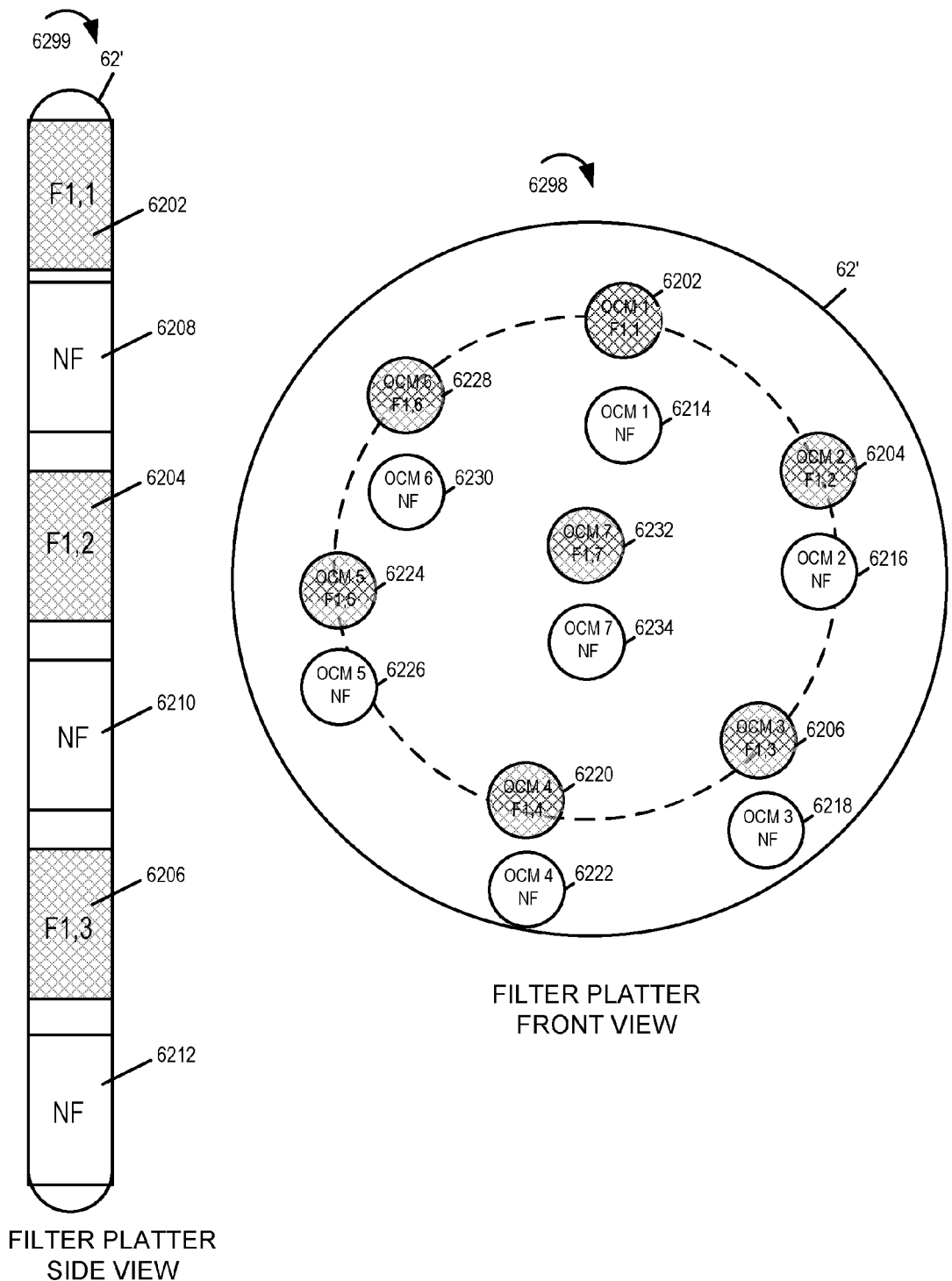
FIG. 5B illustrates the filter platter arrangement shown in FIG. 5A when viewed from the side and when viewed from the front.

FIG. 5A illustrates various exemplary platters that can, and in some embodiments are, used as the filter platter and/or inner lens platter in the camera device 60 of FIG. 4. In the FIG. 5A example N is three (3) but other values of N are possible depending on the embodiment. FIG. 5B shows the exemplary lens platter 62' of FIG. 5A when viewed from the side, drawing 6299, and from the front, drawing 6298.

Platter 62 represents a platter with a single set of filters F1,1 6202 corresponding to OCM1, F1,2 6204 corresponding to OCM 2 and F1,3 6206 corresponding to OCM 3.

Platter 62' represents an alternative platter that can, and in some embodiments is, used in place of platter 62. NF is use to represent a hole or No Filter (NF) area of the platter 62'. As should be appreciated by simply shifting platter 62' vertically the filters F1 (F1, 1 6202, F1, 2 6204, F1, 3 6206) can be replaced by holes (NF 6208, NF 6210, NF 6212), respectively, thereby removing the color or other types of filters previously included in the optical chain modules.

Platter 62" of FIG. 5A represents a platter which includes alternative filters F1' (F1', 1 6214, F1', 2 6216, F1' 3 6206) which can be switched for the filters F1 (F1, 1 6202, F1, 2 6204, F1, 3 6206), respectively, by moving the platter 62" vertically. Thus platter 62" is used to show how filters can be switched for other filters by simple movement of a platter while platter 62' shows how filters can be removed from the optical paths included in a plurality of optical chain modules by shifting of the platter on which a set of filters are mounted.

With regard to drawing 6298 of FIG. 5B, as should be appreciated by simply shifting platter 62' vertically the filters F1 (F1, 1 6202, F1, 2 6204, F1, 3 6206, F1, 4 6220, F1, 5 6224, F1, 6 6228, F1, 7 6232) can be replaced by holes (NF 6208, NF 6210, NF 6212, NF 6222, NF 6226, NF 6230, NF 6234), respectively, thereby removing the color or other types of filters previously included in the optical chain modules.

Lens platter 63 shows a platter of inner lenses L2 (L2,1 6302, L2,2 6304, L2,3 6306) corresponding to first, second and third optical camera modules. Lens platter 63' is an alternative platter which shows how alternative lenses L2' (L2',1 6308, L2',2 6310, L2',3 6312) can be included on a lens platter and easily swapped for the lenses L2 (L2,1 6302, L2,2 6304, L2,3 6306), respectively, by simple movement of the platter 63' vertically or horizontally. Lens platter 63" is used to show that a lens platter may include holes (6314, 6316, 6318) as an alternative to alternative lenses. Any of lens platters 63, 63' or 63" could be used in the camera device 60 shown in FIG. 4. While two lens sets are included in platter 63', multiple lens and/or hole combinations, e.g., 2, 3 or more, may be included in a single platter. Similarly a large number of alternative filter, hole alternatives may be supported in a single filter platter. A platter can also have combinations of lenses, filters and holes and filters could be swapped for lenses or holes.

As should be appreciated given the larger number of lens/filter combinations that can be supported through the use of platters, a single camera device including a number of optical chain modules may support a large number of alternative modes of operation. It should be appreciated that the exposure control of various optical chain modules may be varied along with the filters and/or lenses used at any given point in time allowing for a wide degree of flexibility and control over the images captured at any given point in time.

Figure 6:
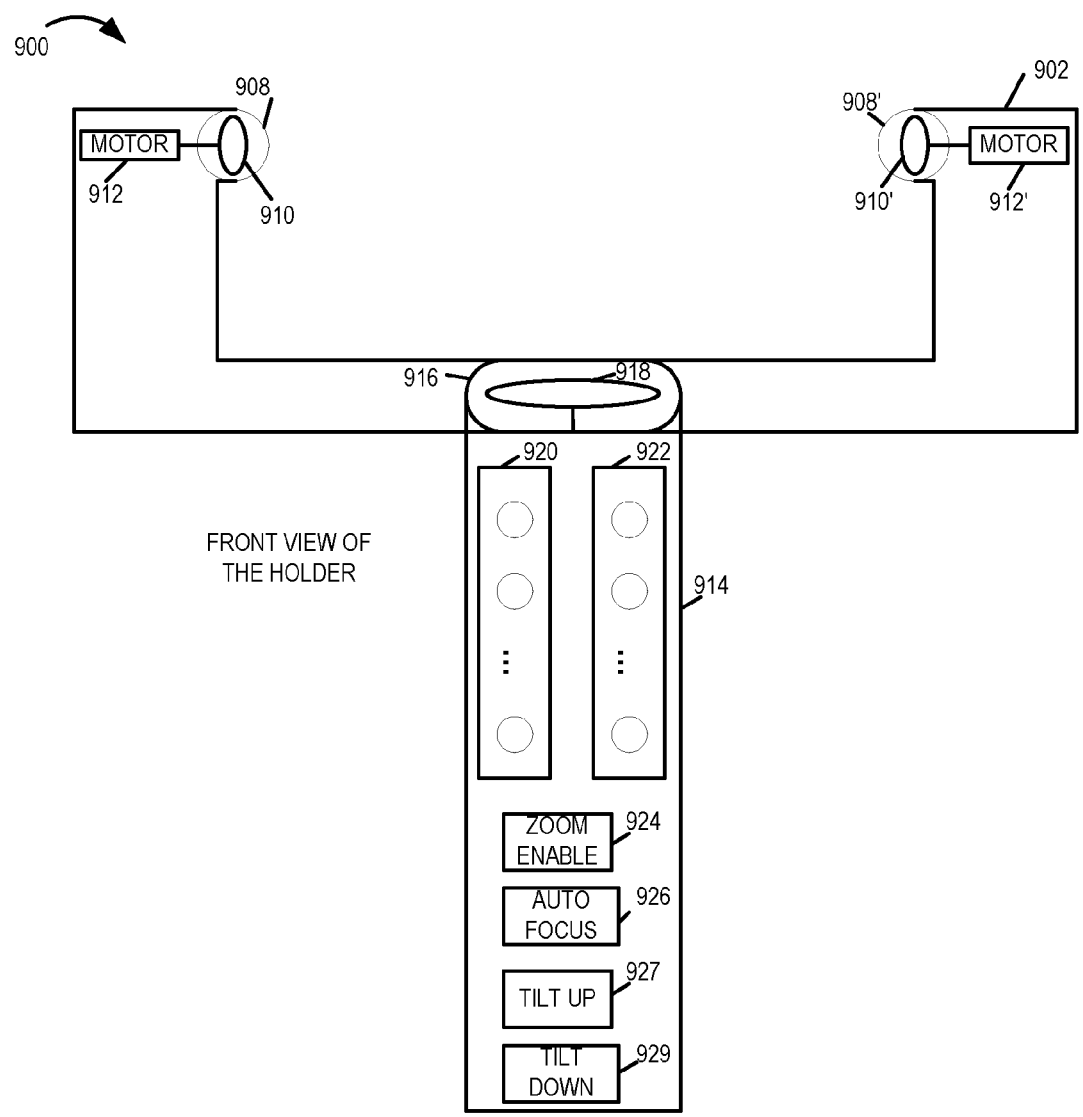
FIG. 6 illustrates a front view of an exemplary camera holder implemented in accordance with an exemplary embodiment.

FIG. 6 illustrates a front view of an exemplary camera holder 900 implemented in accordance with an exemplary embodiment of the present invention. The camera holder includes a support fork 902 and a handle 914. The camera may be inserted into mounts 910, 910' which may be implemented as slotted holders, claims or another type of mount suitable for holing the camera. The mounts 910, 910' are included in pivots 908, 908' as shown in FIG. 6 which allow the mounts 910, 910' to rotate relative to the position of the support fork 902. The mounts 910, 910' are coupled to motors 912, 912', respectively, which are controlled as a function of accelerometer information received from the camera 702 when it is inserted to the support device 900 and, optionally, from accelerator input from an accelerometer module included in the support handle 914 and/or support fork 902. The support fork 902 can rotate relative to the handle 914 via the drive gear or pivot 918 driving the position of the fork 902 which is secured to the handle via rotatable connector 916. The handle includes arrays of light emitters 920, 914 a zoom enable input 924 and a autofocus control 926. The zoom enable input 924 and autofocus input may be implemented using buttons, touch sensors or another input device. The inputs 924, 926 supplement control inputs on the camera and can be used in place of the inputs on the camera when the camera is mounted in the movable support arm 902.

The camera is stabilized while in the support art so that as a users tilting of the handle 914 or rotating of the handle 902 leaves the camera position unchanged and, e.g., facing forward in a consistent direction even as the user may lean or turn left or right. Accordingly though the use of the accelerometer controlled motors many hand movements which might interference with quality image capture can be compensated for and the effect on the camera position minimized as images are captured, e.g., over a period of time as part of capturing video or sequential still images. The stabilization process may be automatically enabled when a user begins image capture and halted when the user stops capturing images via a camera control. In this way power can be conserved. The lights 920, 922 can be powered by batteries include din the support device 900 which also power the motors 912, 912'. While the stabilization may not affect user motion left or right, such changes in the image capture area are often intentional and not the result of unintentional jitter due to hand hold. Furthermore, to the extent that changes up and down or left and right are small and due to unintentional motion they can be compensated for through the use of controlled cropping and/or other image stabilization techniques.

Figure 7:
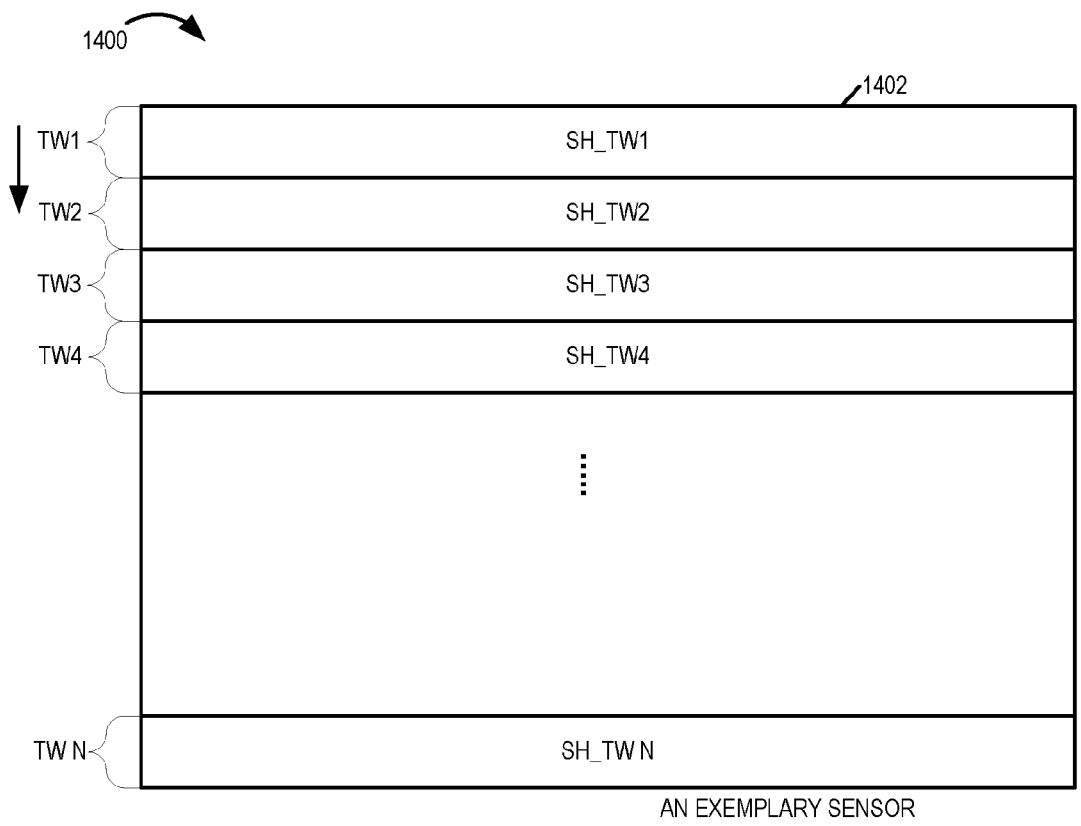
FIG. 7 illustrates an exemplary image sensor and the concept of how a rolling shutter controls sequential read out of different portions of the image sensor at different time periods.

FIG. 7 is a drawing 1400 illustrating an exemplary image sensor 1402 and the concept of how a rolling shutter controls sequential read out of different portions of the image sensor at different time periods. The read out of the first sensor portion will occur at the end of the time window TW1 while the readout of the last, i.e., Nth, sensor portion will occur at time period TW N. While the first sensor portion read out at the end of time period TW1 it should be appreciated that the sensor portion SH_TW1 will be reset at a time period preceding the end of TW1 by the desired exposure time period. Thus, sensor portion SH_TW1 will accumulate charge due to light exposure for a period of time equal to the desired exposure time before the read out occurs. Similarly the reset of the sensor portion SH_TW2 will occur at a time period which is determined based on the exposure time and the end of time period TW2 at which sensor portion will be read out. As a result of the use of the rolling shutter the image portions which are captured corresponding to different time periods.

As recognized by the present invention not all sensor portions are used in the image capture process at the same time when a rolling shutter is used. Thus, using energy to illuminate a portion of an area which is not being captured by a corresponding sensor area can be wasteful. As will be discussed below, lighting energy efficiencies can be achieved by controlling light emitter in a manner that is synchronized with the rolling shutter. In this way illumination of areas of scene which are not being captured while another portion of the scene is being captured can be reduced or avoided saving energy as compared to systems that continually illuminate an entire scene in a uniform manner.

Figure 8:
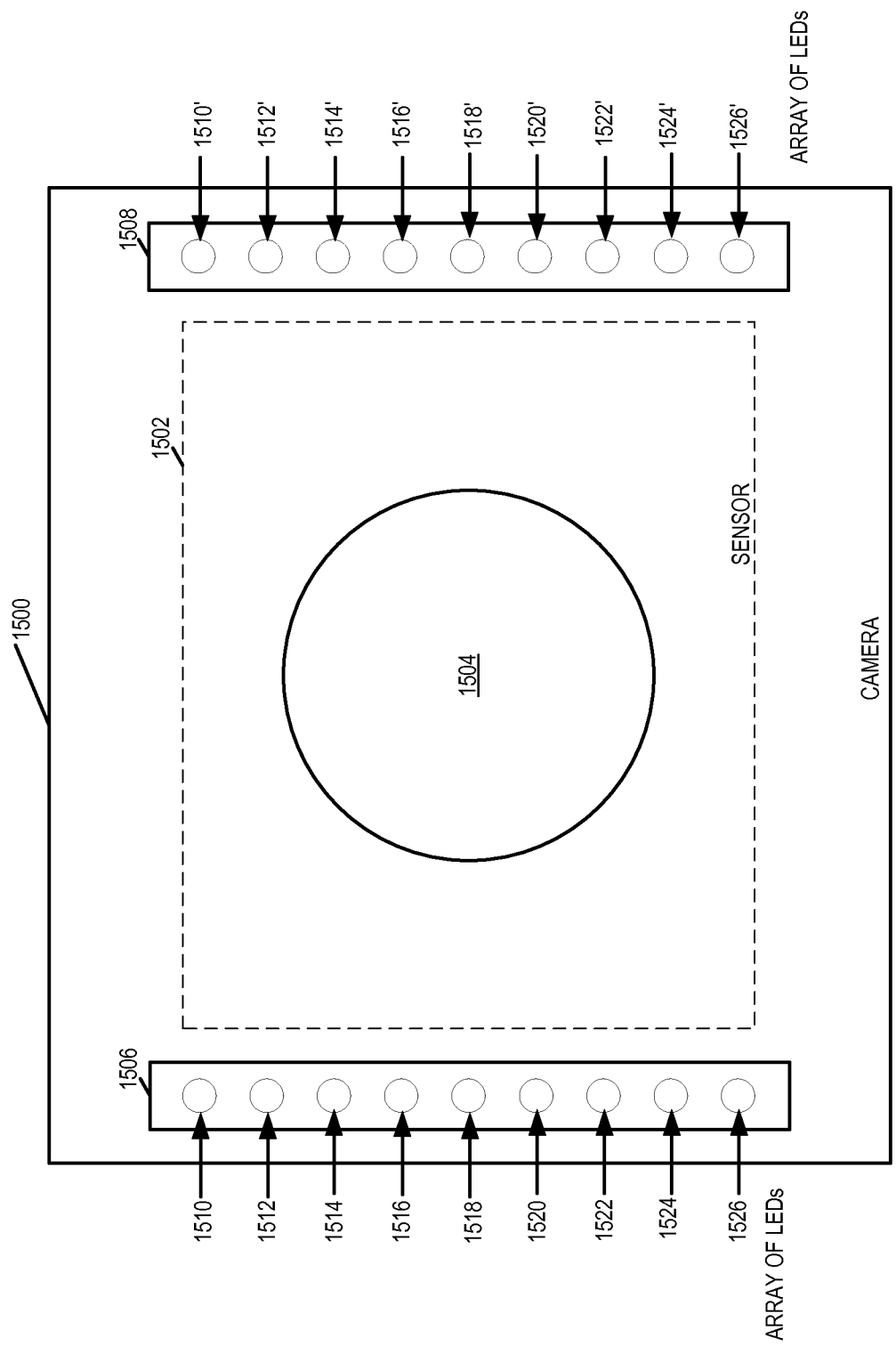
FIG. 8 illustrates an exemplary camera device including an exemplary image sensor such as the one illustrated in FIG. 7 and a plurality of light emitting elements.

FIG. 8 illustrates an exemplary camera device 1500 including an exemplary image sensor 1502 such as the one illustrated in FIG. 7, a lens 1504 and a plurality of light emitting elements 1510, 1512, 1514, 1516, 1518, 1520, 1522, 1524, 1526 and 1510', 1512', 1514', 1516', 1518', 1520', 1522', 1524', 1526' which form arrays 1506, 1508 respectively. In some embodiments, exemplary camera device 1500 of FIG. 8 is exemplary camera device 100 of FIG. 1A.

Figure 9:
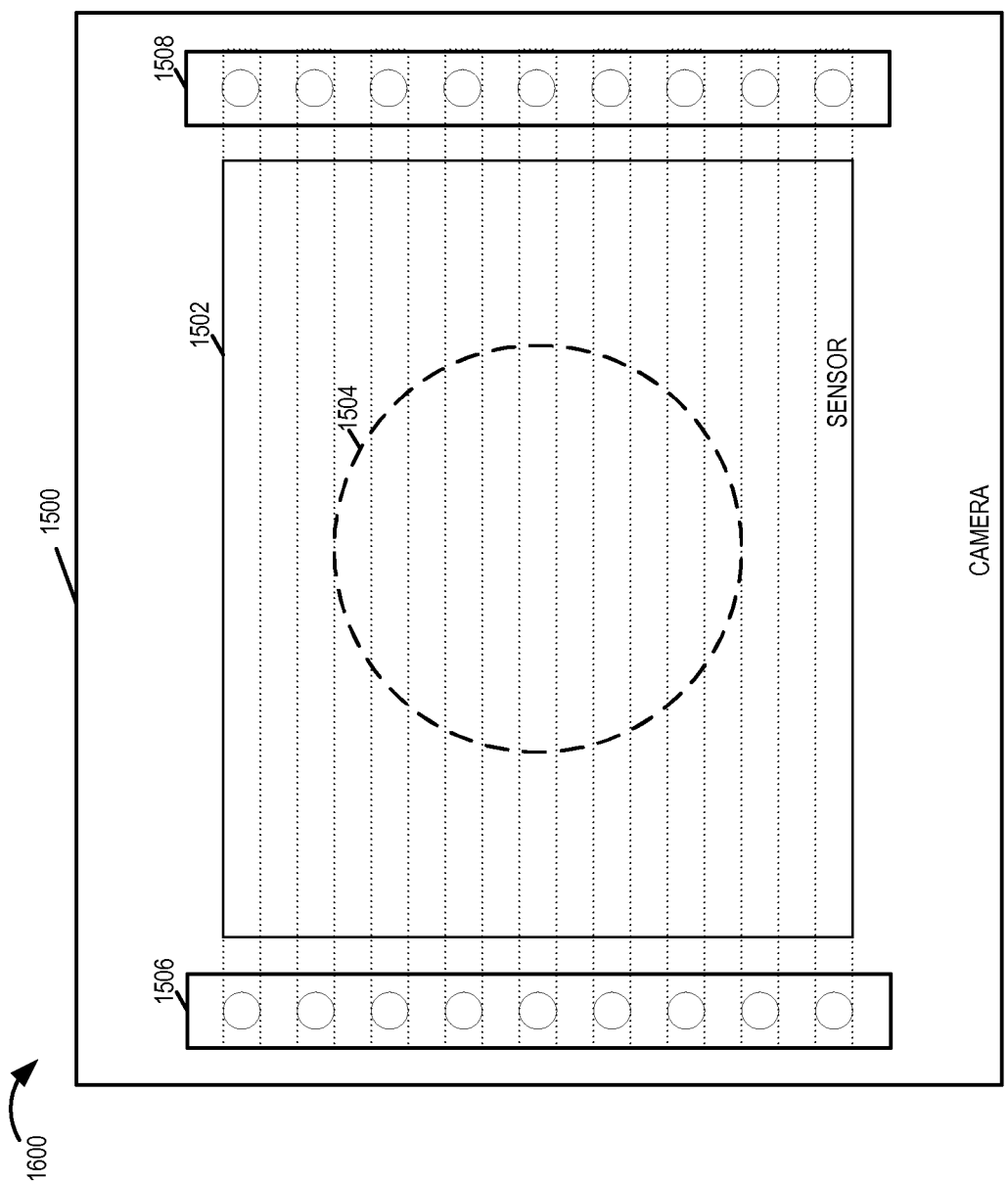
FIG. 9 is a drawing showing the exemplary camera of FIG. 8 and illustrating the concept of controlling different sets of light emitting elements at different times in a manner that is synchronized with the timing of a rolling shutter.

FIG. 9 is a drawing showing the exemplary camera 1500 of FIG. 8 and illustrating the concept of controlling different sets of light emitting elements at different times in a manner that is synchronized with the timing of a rolling shutter. The dotted lines are used to show how the lights correspond to in the FIG. 9 embodiment to roller shutter read out points in time on the sensor 1502. The lights of the arrays 1506 and 1508 corresponding to a portion of the sensor 1502 are activated while the corresponding sensor portion is intentionally being exposed prior to read out as part of the image capture process. Note that all the LEDs need not be illuminated at the same time with the illumination progressing from the top of the arrays 1506, 1508 to the bottom of the arrays as image exposure and sensor readout occur in the same direction with the activation of particular LEDs being coordinated with the operation of the rolling shutter and the controlled exposure of the sensor image areas. As should be appreciated, it may not be necessary to have the top LEDs active while the Nth sensor portion is being used to capture an image since the contribution to illuminating the area being observed by the Nth portion of the sensor may be relatively limited particularly in the case where lenses are used or the nature of the light emitter is relatively directional as is sometimes the case with LEDs.

Figure 10:
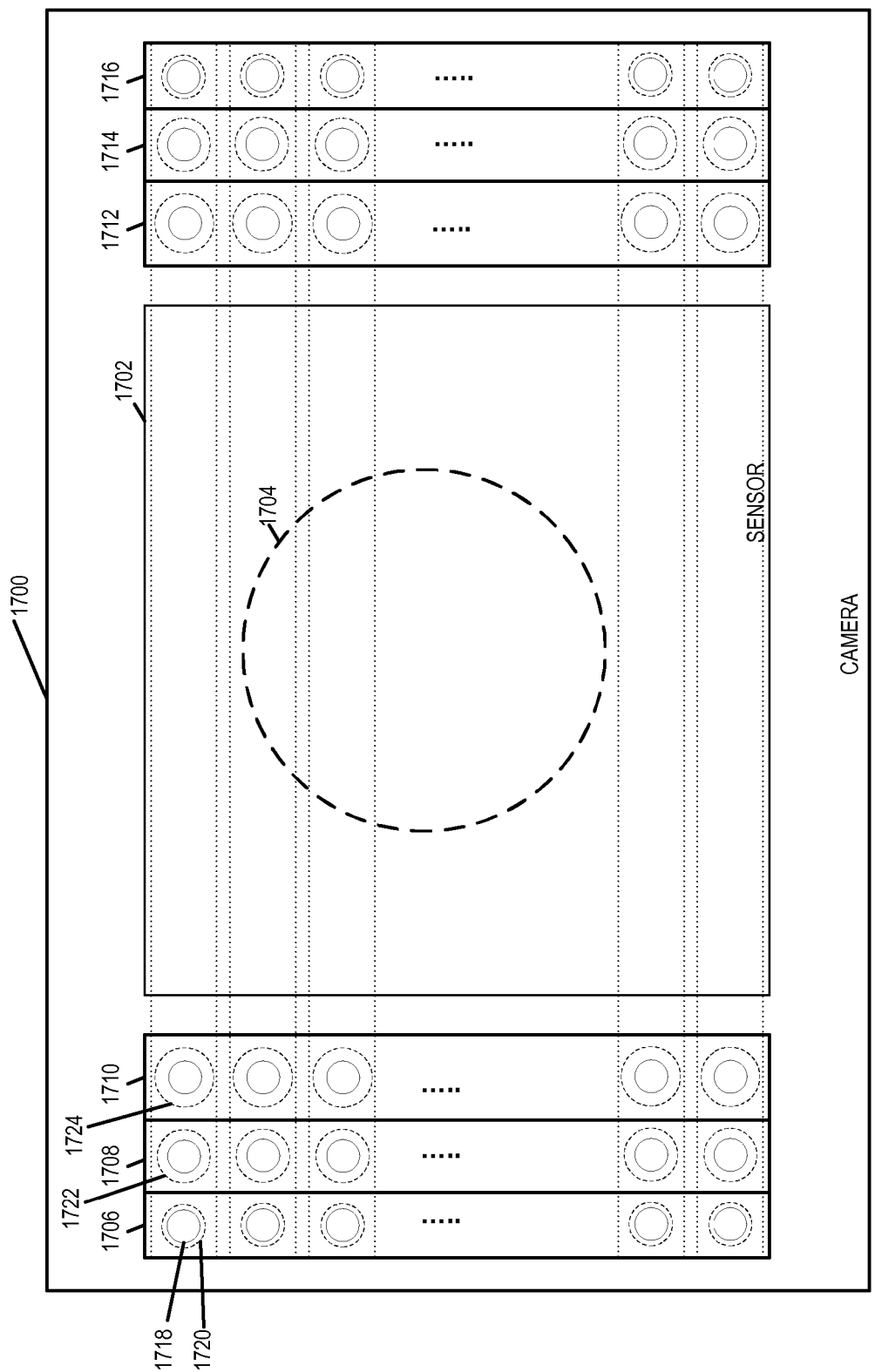
FIG. 10 illustrates another exemplary camera device including an exemplary image sensor and a plurality of arrays of light emitting elements with some of the being covered with different lenses, and further illustrates the concept of controlling different sets of light emitting elements at different times in a manner that is synchronized with the timing of a rolling shutter.

FIG. 10 illustrates another exemplary camera device 1700 including an exemplary image sensor 1702 and a plurality of arrays of light emitting elements (1706, 1708, 1710, 1712, 1714, 1716) with some of the light emitting elements being covered with different lenses. The solid circle, e.g., exemplary solid circle 1718, in each of the light emitting arrays represents the light emitter while the circle shown using dashed lines, e.g., exemplary dashed line circle 1720, represents a lens. In FIG. 10, three sets of different lens are used for the light emitters, as indicated by different size dashed line circles, e.g., exemplary dashed line circles (1720, 1722, 1724). Left and right light arrays are provided on each side of the camera 1700. In the FIG. 10 embodiment which arrays are used is selected based on the zoom or lens used to capture an image so that the illumination can be matched to the image area which will be captured.

In the FIG. 10 embodiment the array selected based on the focal length or lens being used to capture the image may, and in some embodiments is, operated in manner that is synchronized with operation of the rolling shutter used in the camera 1700.

Figure 11B:
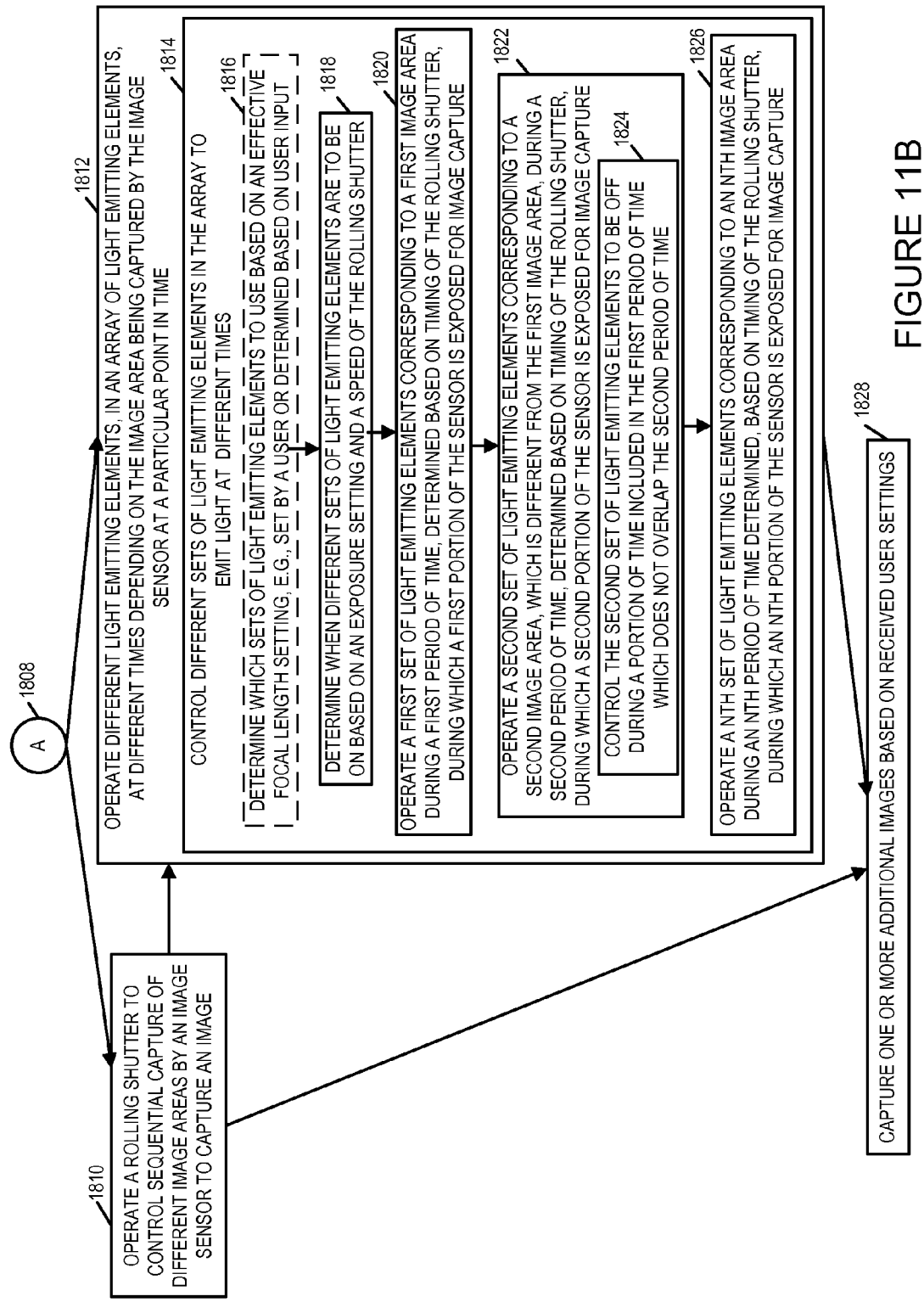
FIG. 11B illustrates a second part of a flowchart showing the steps of an exemplary method of controlling an imaging device in accordance with an exemplary embodiment of the invention.

FIG. 11, comprising the combination of FIG. 11A and FIG. 11B, is a flowchart 1800 illustrating the steps of an exemplary method of controlling an imaging device such as that shown in FIGS. 8 and/or 10 including multiple light emitting elements and at least one sensor with a rolling shutter in accordance with an exemplary embodiment. In some embodiments, the illumination is synchronized with more than one sensor on a multi-module device. In some such embodiments, there may be a different master sensor at a given time, and the illumination is controlled to sync with the current master sensor. The camera devices of FIGS. 8 and 10 can and sometimes do include the same or similar elements as the camera device of FIG. 1A.

The method of flowchart 1800 can be, and in some embodiments is, performed using a camera device such as the camera 100 of FIG. 1A. The exemplary method starts in step 1802 where the camera is powered on and initialized. Operation proceeds from step 1802 to step 1804. In step 1804 user input setting regarding focal length to be used for image capture is received. In some embodiments step 1804 includes step 1805 and step 1807. In step 1805 user input is received indicating a user setting. Operation proceeds from step 1805 to step 1807. In step 1807, the focal length is determined from the user setting received in step 1805. In some embodiments the focal length is set by a user via a zoom control input. For example, based on information from a user zoom control input interface indicating a user setting for zoom, which is received in step 1805, the focal length is determined in step 1807. In some embodiments, step 1804 includes step 1809 in which user input indicating a user selected focal length setting is received. Operation proceeds to step 1806. In step 1806 user input setting indicating exposure time to be used for image capture is received. The user specified or determined focal length and exposure time for image capture may be stored in the memory as user based camera configuration settings.

Operation proceeds from step 1806 to steps 1810 and 1812 via connecting node 1808. Steps 1810 and 1812 are performed as part of operating the camera device to capture one or more images. In some embodiments the steps 1810 and 1812 are performed in parallel however, as will be discussed, the rolling shutter timing is used in accordance with the features of some embodiments to control light emitting elements. In step 1810 a rolling shutter is operated to control sequential capture of different image areas by an image sensor to capture an image. In various embodiments the rolling shutter is an electronic shutter that controls reading out of different portions of said image sensor at different times. As indicated by the arrow from box 1810 to 1812, step 1812 uses rolling shutter timing input to control the operations performed in step 1812 in some embodiments.

In step 1812 different light emitting elements in an array of lighting elements included in the plurality of light emitting elements are operated at different times depending on the image area being captured by said image sensor at a particular point in time at different times. Control of the light emitting elements is synchronized with operation of the rolling shutter with the amount of time one or more light emitting elements remain on being a function of the exposure time being used. By selectively controlling which light elements are on at a particular point in time based on rolling shutter operation, power can be conserved as compared to systems which fully illuminate an entire area by keeping all light emitting elements on for the full duration of an image capture process.

In some embodiments, in addition to or in place of step 1812, the illumination is controlled by controlling light emitting elements or an opto-electronic element or mechanical element such as a scanning mirror or a rotating polygon reflector that directs the angle of the scanning light beam to the approximate location on cue.

In various embodiments step 1814 is performed as part of performing step 1812. In step 1814 different sets of light emitting elements in the array are controlled to emit light at different times. In various embodiments the controlling step 1814 includes one or more of steps 1816 through 1826, with step 1816 being optional (as indicated by the dashed line box).

In some embodiments different sets of light emitting elements in the plurality of light emitting elements are covered with different lenses. The lenses may correspond to lenses which may be selected by a user for image capture purposes and which are used as part of the optical chain module or modules of the camera. In some such embodiments step 1816 is performed where it is determined which sets of light emitting elements are to be used based on an effective focal length setting or a lens being used by the imaging device for image capture. In some embodiments, the effective focal length setting is set by the user, e.g., in step 1809. In some embodiments, the effective focal length setting is determined, e.g., in step 1807, based on user input such as user zoom input information, e.g., received in step 1805. In some embodiments the user specified or determined focal length setting (received via user input in step 1809 or determined based on user input in step 1807) is checked to determine which sets of light emitting elements are to be used so that the lens used over the light emitting device can be matched or coordinated with the lens or group of lenses used with a sensor to provide proper illuminate of the area which is to be imaged by the sensor.

In some embodiments, the effective focal length of the illumination can be, and sometimes is, changed, e.g., to approximately match the effective focal length setting. In one embodiment the effective focal length of the illumination can be changed by having a plurality of alternative separate light modules, which may be selected, each light module with a different focal length, e.g., three alternative light modules with three different effective focal lengths of the illumination. In another example, one light module has multiple, e.g., 3, positions or configurations of a multi-element lens/optic which effectively delivers multiple, e.g., 3, different focal lengths of the illumination. In some embodiments, additional optics, e.g., a movable, mirror, a rotatable polygon mirror, etc., are used to add tilt angles to direct an illumination beam. In some such embodiments, the tilt angles of the illumination beam are changed for row by row scanning.

Operation proceeds to step 1818. In step 1818 it is determined when different sets of the light emitting elements are to be on based on an exposure setting. In some embodiments determining when different sets of the light emitting elements are to be on is further based on an amount of time between read outs of different portions of the sensor, e.g., as controlled by the rolling shutter timing.

Operation proceeds to step 1820. In step 1820 a first set of light emitting elements corresponding to a first image area is operated during a first period of time, determined based on the timing of the rolling shutter, during which a first portion of said sensor is exposed for image capture. In various embodiments operating the first set of light emitting elements corresponding to a first image area during a first period of time includes illuminating the first set of light emitting elements during the first period of time. The duration of the first period of time may be a function of the exposure time. In some embodiments the illumination is performed for the duration of the exposure time while in other embodiments a strobe or other bright light is used during at least a portion of the exposure time but possibly not the full duration of the exposure time.

Operation proceeds to step 1822. In step 1822 a second set of light emitting elements corresponding to a second image area which is different form said first image area is operated during a second period of time, determined based on the timing of said rolling shutter, during which a second portion of said sensor corresponding is being exposed for image capture. In some embodiments the first period of time includes at least a portion of time which does not overlap said second period of time. It should be appreciated that the length of the exposure period may affect whether there is overlap of the first and second period of time with overlap being more likely in cases where there are long exposure times. In some embodiments step 1822 includes performing step 1824 where the second set of light emitting elements is controlled to be off during at least a portion of time included in said first period of time which does not overlap said second period of time. The off period of time of the first set of light emitting elements may correspond to the time period in which the exposure corresponding to the second sensor readout area does not overlap the exposure period associated with the first sensor readout area.

Operation proceeds to step 1826. In step 1826 an Nth set of light emitting elements corresponding to an Nth image area is operated to output light during an Nth time period, the Nth time period being determined based on the timing of the rolling shutter and being a period of time during which an Nth portion of the sensor is exposed for image capture, N being an integer value corresponding to the total number of time periods used by said rolling shutter to complete one full read out of said image sensor. For example, N would be 3 if the rolling shutter corresponded to 3 sensor readouts to fully readout out a sensor. It should be appreciated that in most cases N will be relatively large, e.g., greater than 10 or even greater than a hundred or an even a much larger number.

In some embodiments, instead of or in addition to controlling different sets of light elements in said array to emit lights at different times, the properties of one or more light emitting element are controlled to emit light with different beam directions/angles at different times.

Operation proceeds to step 1812 to step 1828. In step 1828 the camera device is controlled to capture one or more images based on the received user settings, e.g., exposure and/or focal length settings. Step 1828 may include repeating steps 1810 and 1812 based on the received user settings. The light control process may repeat with the user changing the exposure time and/or focal length setting between each image capture or with the camera device automatically optimizing and adjusting the exposure setting based on lighting and/or other conditions.

Figure 12:
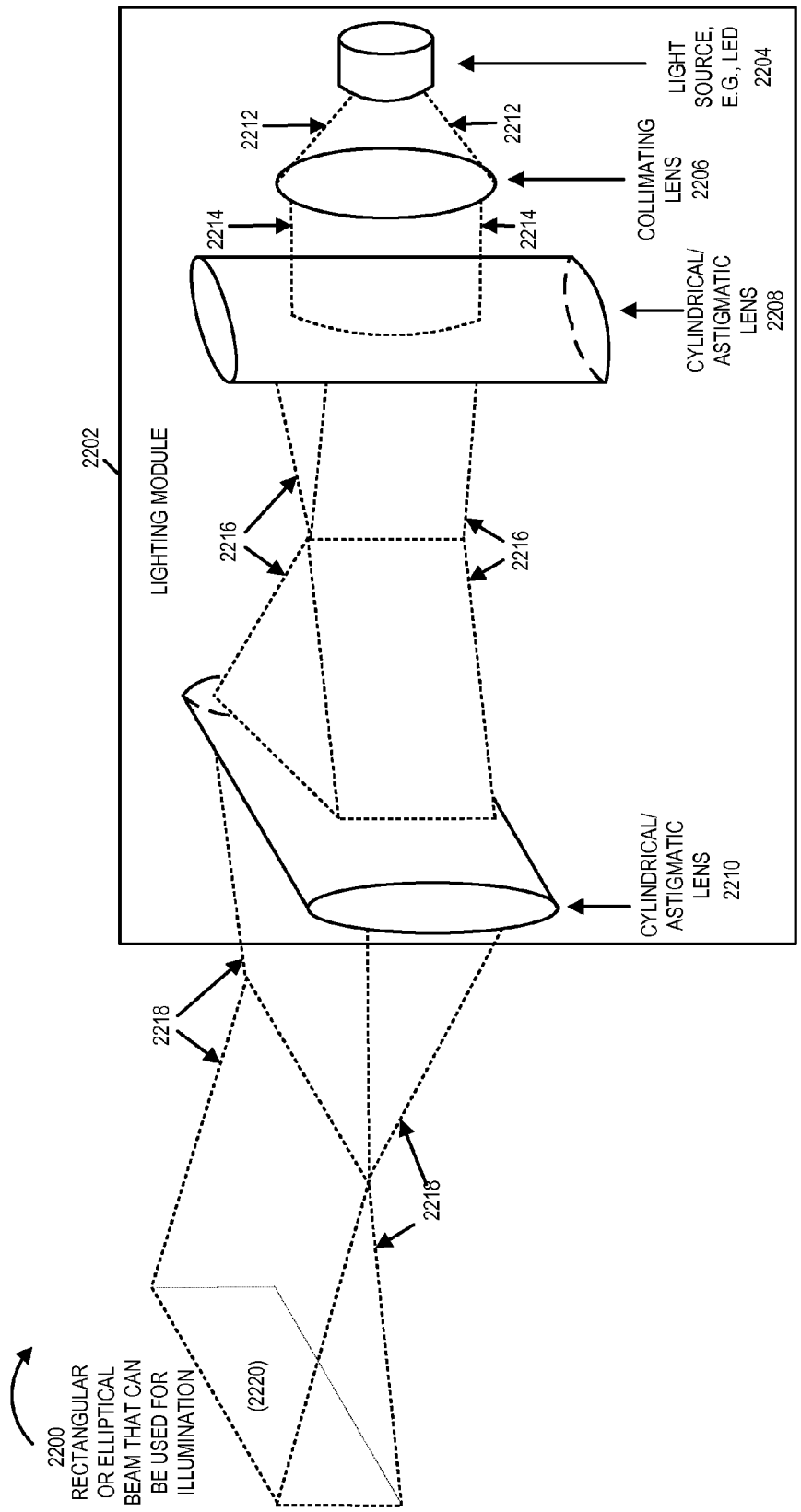
FIG. 12 is a drawing illustrating an exemplary lighting module and an exemplary output beam from the lighting module in accordance with an exemplary embodiment.

FIG. 12 is a drawing 2200 illustrating an exemplary lighting module 2202 and an exemplary output beam 2218 from the lighting module in accordance with an exemplary embodiment. Exemplary lighting module 2202 includes a light source 2204, e.g., a light emitting diode (LED), a collimating lens 2206, a first cylindrical/astigmatic lens 2208 and a second cylindrical/astigmatic lens 2210. Light source 2204 output 2212 is input to collimating lens 2206 which produces first intermediate light beam 2214. First intermediate light beam 2214 is further processed by first cylindrical/astigmatic lens 2208 to produce second intermediate light beam 2216. Second intermediate light beam 2216 is further processed by second cylindrical/astigmatic lens 2210 to produce output beam 2218. The output light beam 2218 has a rectangular or elliptical end shape as indicated by rectangular shape 2220 at the end of the beam 2218.

Figure 13:
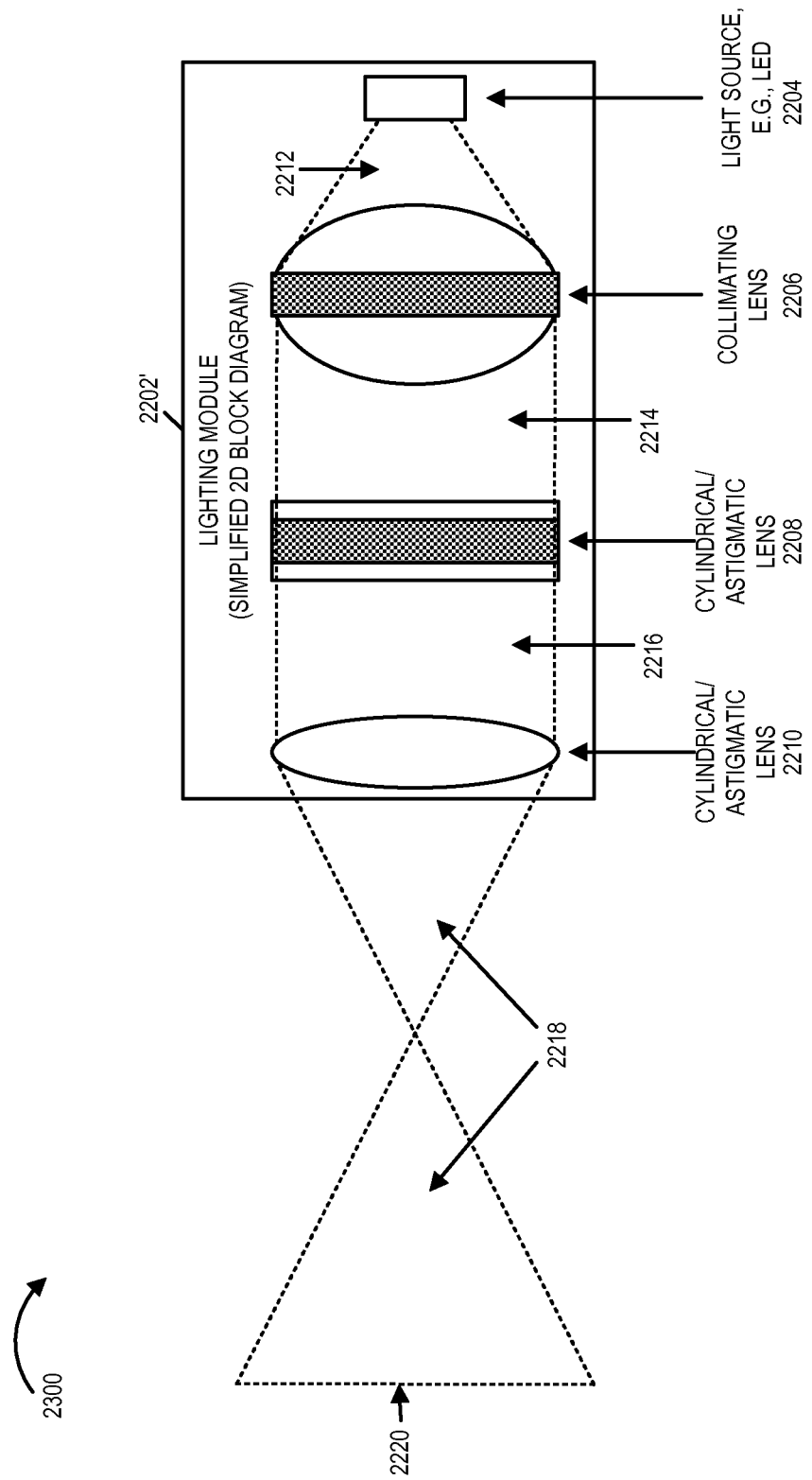
FIG. 13 is a drawing illustrating a simplified 2D block diagram drawing of the exemplary lighting module of FIG. 12.

FIG. 13 is a drawing 2300 including a simplified 2 dimensional (2D) drawing corresponding to FIG. 12. Simplified 2D block diagram 2202' is used to represent exemplary lighting module 2002, which includes light source 2204, collimating lens 2206, first cylindrical/astigmatic lens 2208 and second cylindrical/astigmatic lens 2210. The various light beams (2212, 2214, 2216, and 2218), which are produced, and end 2220 of light beam 2218 are also indicated in FIG. 13.

Figure 14:
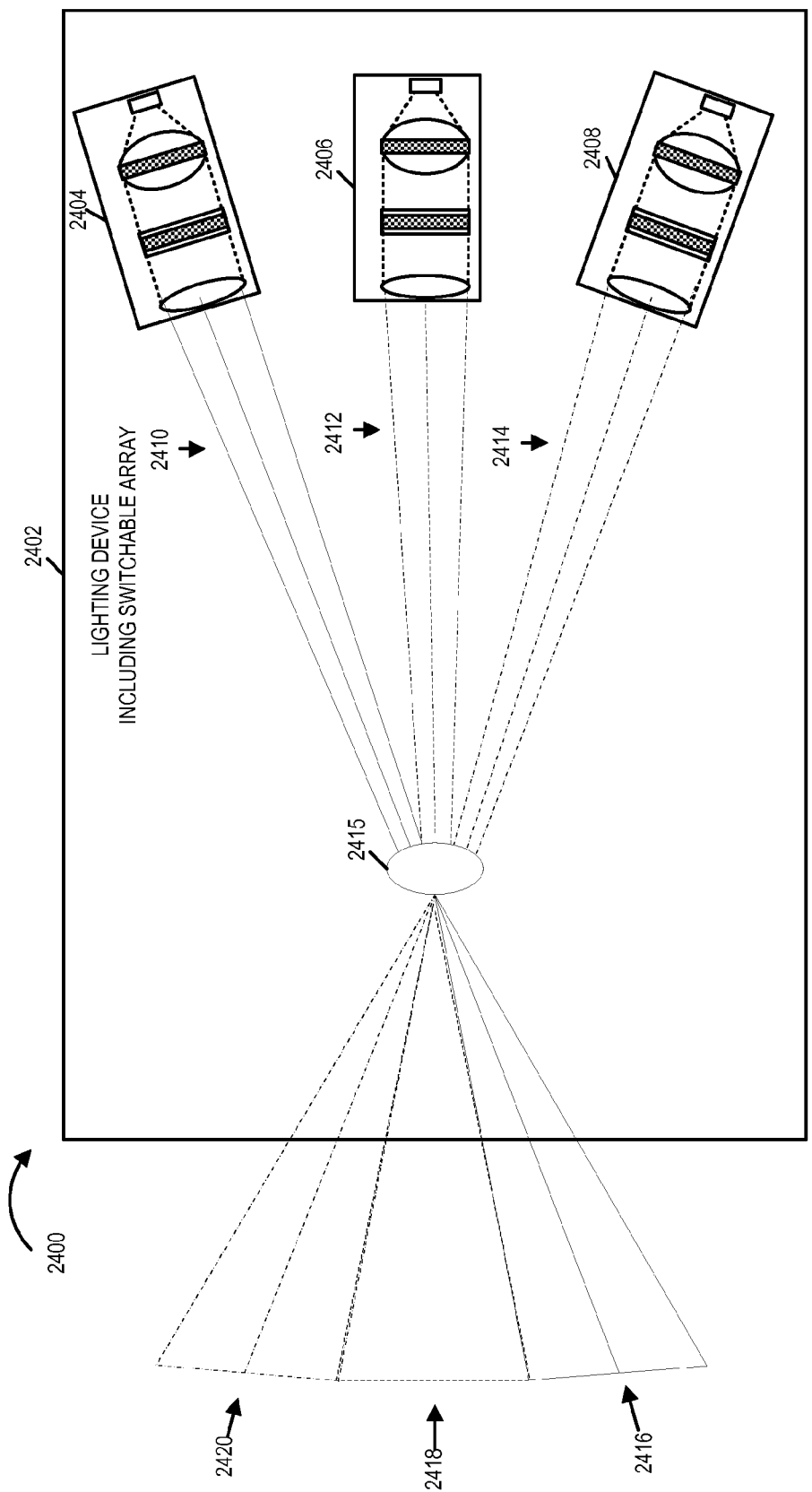
FIG. 14 illustrates an exemplary lighting device including a switchable array of lighting modules in accordance with an exemplary embodiment.

FIG. 14 is a drawing 2400 which illustrates an exemplary lighting device 2402 including a switchable array of lighting modules (2404, 2406, 2408) and a lens 2415 in accordance with an exemplary embodiment. Each of the exemplary lighting modules (2404, 2406, 2408) is, e.g., a lighting module in accordance with exemplary lighting module 2202 of FIG. 12 and/or lighting module 2202' of FIG. 13. Output beam 2410 from lighting module 2404 is focused by lens 2415 to form output light beam 2416. Output beam 2412 from lighting module 2406 is focused by lens 2415 to form output light beam 2418. Output beam 2414 from lighting module 2408 is focused by lens 2415 to form output light beam 2420.

In various embodiments, each of the lighting modules (2404, 2406, 2408) can be switched on/off independently from the other lighting modules, e.g., to cause different portions of the scene area to be illuminated at different times. In some embodiments, subsets of the lighting modules may be, and sometimes are, controlled to be in an on-state at the same time.

Figure 15:
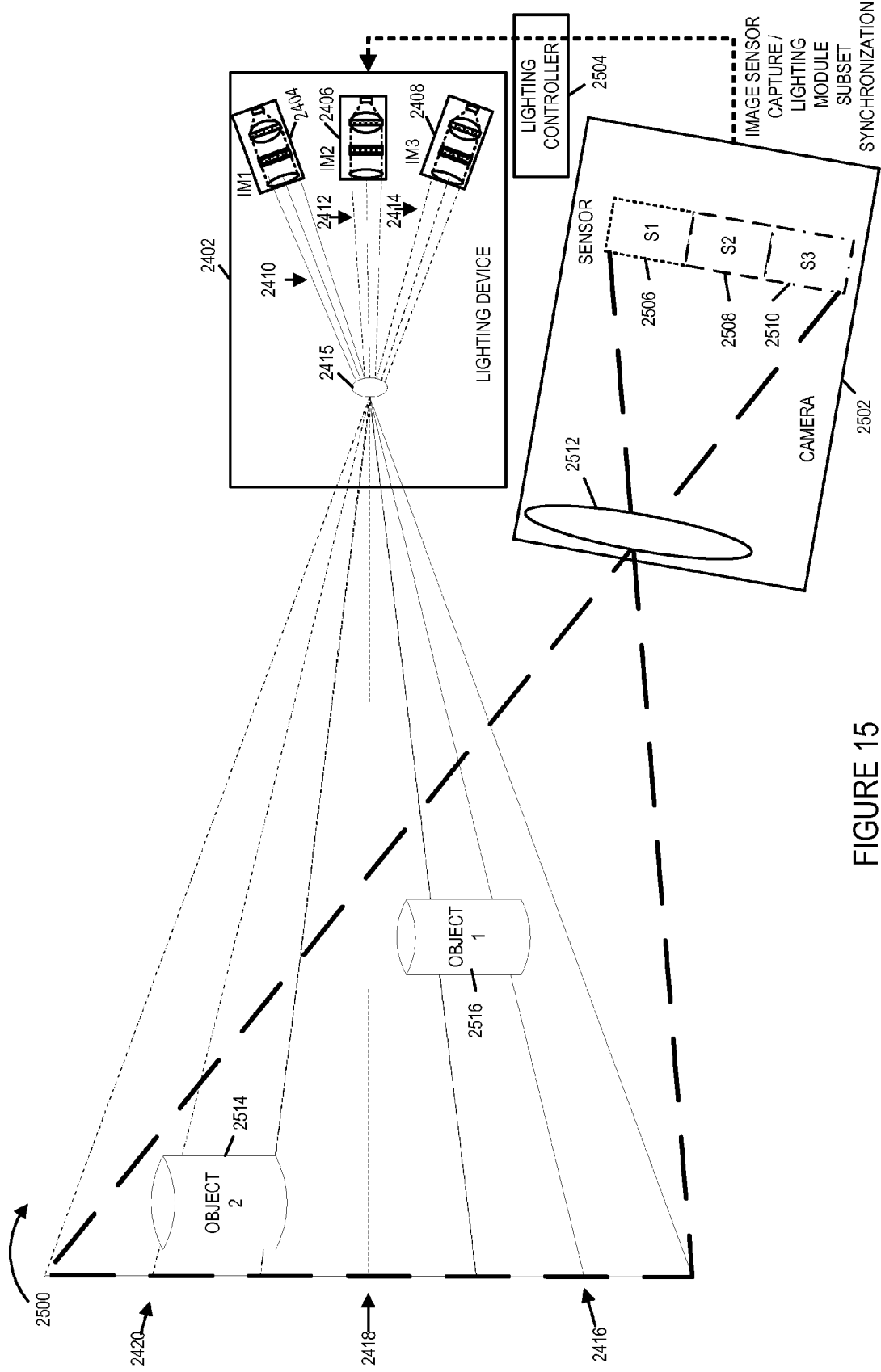
FIG. 15 illustrates an exemplary system including an exemplary lighting device, including a switchable array of lighting modules, and an exemplary camera in accordance with an exemplary embodiment.

FIG. 15 is a drawing 2500 illustrates an exemplary system including exemplary lighting device 2402 of FIG. 14, including a switchable array of lighting modules (2404, 2406, 2408) sometimes referred to as illumination modules (IMs), an exemplary camera 2502, and a lighting controller 2504 in accordance with an exemplary embodiment.

Exemplary camera 2502 includes a lens 2512 for focusing captured received light corresponding to an image scene area onto a plurality of sensors (S1 2506, S2 2508, S3 2510) for capturing an image. In some embodiments, S1 2506, S2 2508 and S3 2510 are different sensors. In some other embodiments, S1 2506, S2 2508 and S3 2510 are different portions of a larger single sensor. In this example different portions of the image scene area are captured by different sensors (2506, 2508, 2510), e.g., at different times.

In this example, there are two exemplary objects (object 1 2516 and object 2 2514) in the image scene area being captured by camera 2502. A first portion of object 1 2516 is illuminated by output beam 2416 from lighting module 2404, and a second portion of object 1 2516 is illuminated by output beam 2418 from lighting module 2406.

A first portion of object 2 2514 is illuminated by output beam 2418 from lighting module 2406, and a second portion of object 2 2514 is illuminated by output beam 2420 from lighting module 2408.

Consider that sensor S1 2506 captures the portion of the image scene area which is illuminated by light beam 2416; consider that sensor S2 2508 captures the portion of the image scene area which is illuminated by light beam 2418; and consider that sensor S3 2510 captures the portion of the image scene area which is illuminated by light beam 2420.

Lighting controller 2504, sends signals to and receives signals from both camera 2502 and lighting device 2402 to synchronize operation between image sensor capture and lighting module on state such that the portion of the image scene being captured at a give time is being illuminated. For example, lighting module 2404 is controlled by lighting controller 2504 to be turned on while corresponding sensor S1 2506 is capturing a first portion of the image scene area; lighting module 2406 is controlled by lighting controller 2504 to be turned on while corresponding sensor S2 2508 is capturing a second portion of the image scene area; and lighting module 2408 is controlled by lighting controller 2504 to be turned on while corresponding sensor S3 2510 is capturing a third portion of the image scene area.

Figure 16:
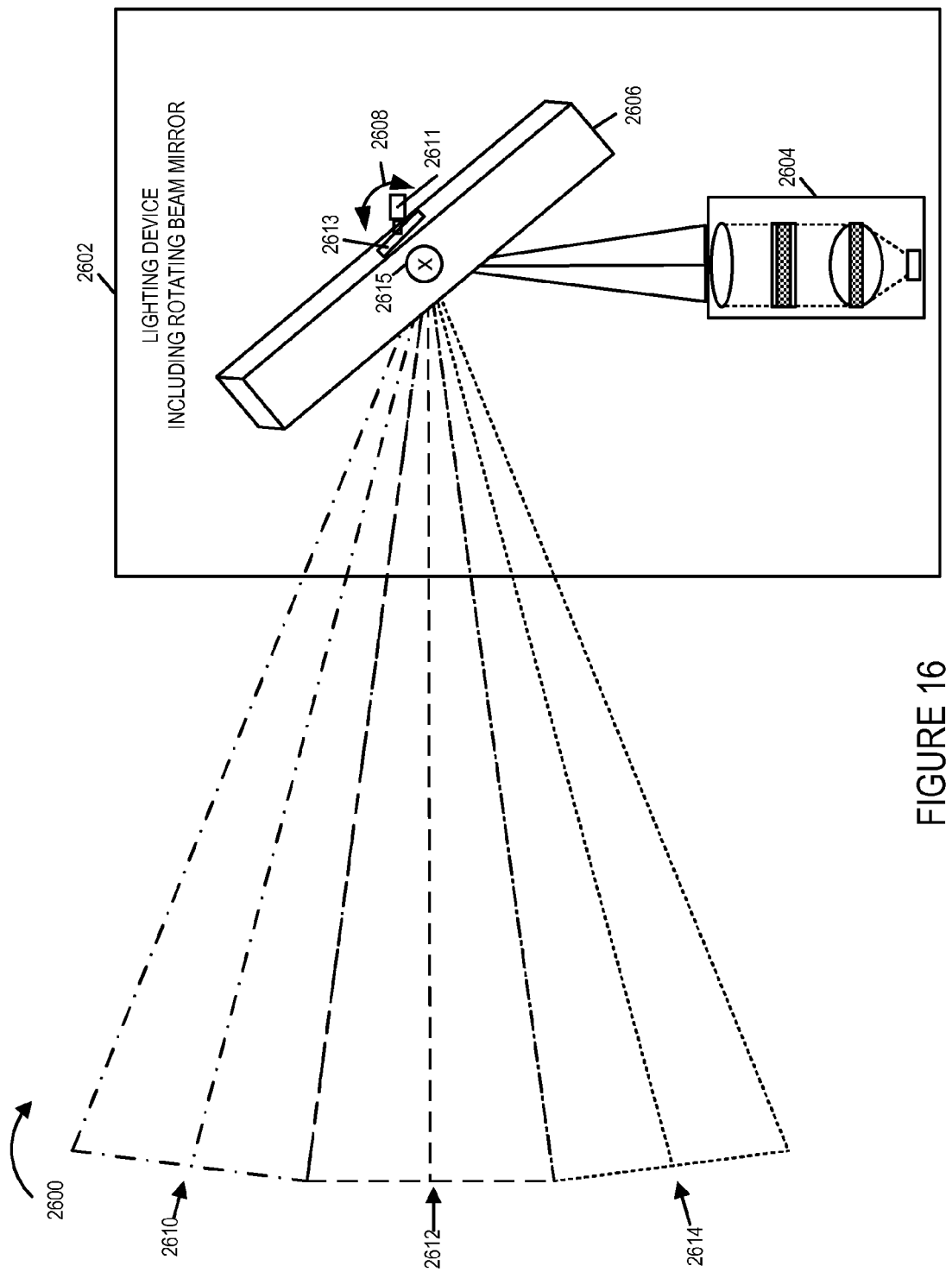
FIG. 16 illustrates an exemplary lighting device including a lighting module and a rotating beam mirror in accordance with an exemplary embodiment.

FIG. 16 is a drawing 2600 which illustrates an exemplary lighting device 2602 including a lighting module 2604 and a rotating beam mirror 2606 in accordance with an exemplary embodiment. Lighting modules 2604 is, e.g., a lighting module in accordance with exemplary lighting module 2202 of FIG. 12 and/or lighting module 2202' of FIG. 13. The rotating beam mirror 2606 redirects the output beam 2605 from the lighting module 2604. Hinge 2613, which is attached to rotating beam mirror 2606, allows the rotating beam mirror 2606 to rotate, as indicated by arrow 2608, e.g., within predetermined controlled limits. Drive device 2611, e.g., a motor with gearing, is used to move the hinge 2613. Rotary position sensing device 2615, e.g., a resolver, a synchro, or an optical position sensing device, is used to measure the position to which the rotating beam mirror is set. In this example, three exemplary output beams (2610, 2612, 2614) are shown corresponding to three different position setting of the rotating beam mirror 2606.

Figure 17:
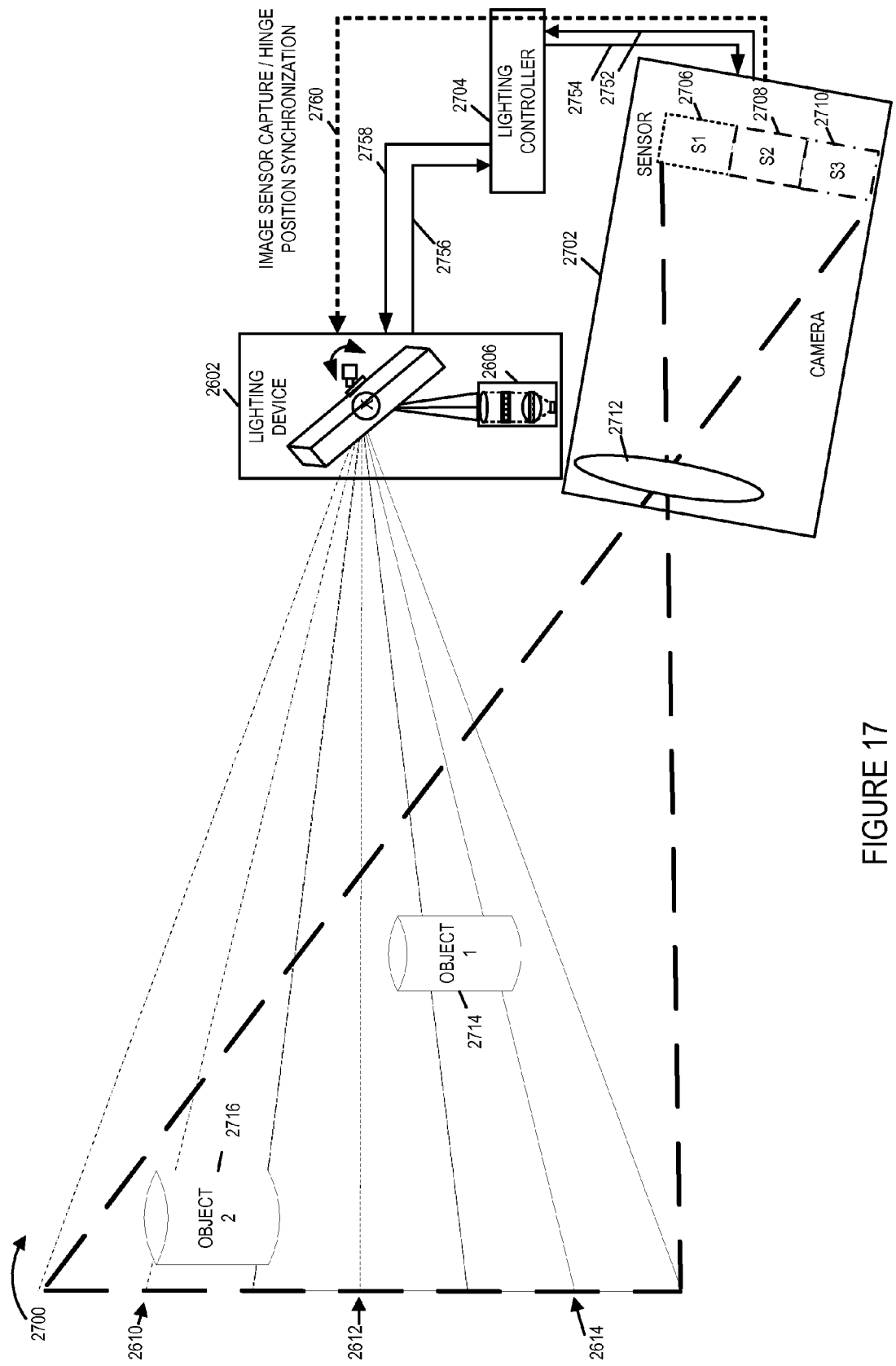
FIG. 17 illustrates an exemplary system including an exemplary lighting device, including a lighting module and a rotating beam mirror, and an exemplary camera in accordance with an exemplary embodiment.

FIG. 17 is a drawing 2700 illustrates an exemplary system including exemplary lighting device 2602 of FIG. 16, including a rotating beam mirror, an exemplary camera 2702, and a lighting controller 2704 in accordance with an exemplary embodiment.

Exemplary camera 2702 includes a lens 2712 for focusing captured received light corresponding to an image scene area onto a plurality of sensors (S1 2706, S2 2708, S3 2710) for capturing an image. In some embodiments, S1 2706, S2 2708 and S3 2710 are different sensors. In some other embodiments, S1 2706, S2 2708 and S3 2710 are different portions of a larger single sensor. In this example different portions of the image scene area are captured by different sensors (2706, 2708, 2710), e.g., at different times.

In this example, there are two exemplary objects (object 1 2714 and object 2 2716) in the image scene area being captured by camera 2702. A first portion of object 1 2714 is illuminated by output beam 2616 from lighting device 2602, corresponding to a first angular setting of the rotating beam mirror, and a second portion of object 1 2714 is illuminated by output beam 2612 from lighting device 2602, corresponding to a second angular setting of the rotating beam mirror.

A first portion of object 2 2716 is illuminated by output beam 2612 from lighting device 2602, corresponding to the second angular setting of the rotating beam mirror, and a second portion of object 2 2716 is illuminated by output beam 2610 from lighting device 2602, corresponding to a third angular setting of the rotating beam mirror.

Consider that sensor S1 2706 captures the portion of the image scene area which is illuminated by light beam 2614; consider that sensor S2 2708 captures the portion of the image scene area which is illuminated by light beam 2612; and consider that sensor S3 2710 captures the portion of the image scene area which is illuminated by light beam 2610.

Lighting controller 2704 receives signals 2752, e.g., an image capture timing synchronization signal, from camera 2702 and sends signals 2754, e.g., an acknowledgment signal, to camera 2702. Lighting controller 2704 sends signals 2758, e.g., an angular position setting control signal and/or a timing synchronization signal, to lighting device 2602 and receives signals 2756, e.g., an angular position measurement signal, from lighting device 2602. In some embodiments, the rotating beam mirror position is controlled using closed loop control under the direction of the lighting controller. In some embodiments, the lighting module 2604 is controlled under the direction of the lighting controller 2704 to be on during time intervals including image capture time intervals. In some such embodiments, during at least some other time intervals, the lighting module 2604 of lighting device 2602 is controlled to be in an off state, e.g., to conserve power.

Lighting controller 2704 synchronizes operation between image sensor capture, rotating beam mirror and lighting module on state, such that the portion of the image scene being captured at a give time is being illuminated.

For example, lighting module 2604 is controlled by lighting controller 2704 to be turned on and rotating beam mirror 2606 is controlled to be set to a first angular position setting to generate beam 2614 while corresponding sensor S1 2706 is capturing a first portion of the image scene area; lighting module 2604 is controlled by lighting controller 2704 to be turned on and rotating beam mirror 2606 is controlled to be set to a second angular position setting while corresponding sensor S2 2708 is capturing a second portion of the image scene area; and lighting module 2604 is controlled by lighting controller 2704 to be turned on and rotating beam mirror 2606 is controlled to be set to a third angular setting while corresponding sensor S3 2710 is capturing a third portion of the image scene area.

In some embodiments, the hinged rotating beam mirror is controlled to be gradually rotated back and forth, generating a sweeping light beam that moves back and forth, such that the sweeping light beam covers the portion of the image scene area being captured by a sensor at a given time.

Figure 18:
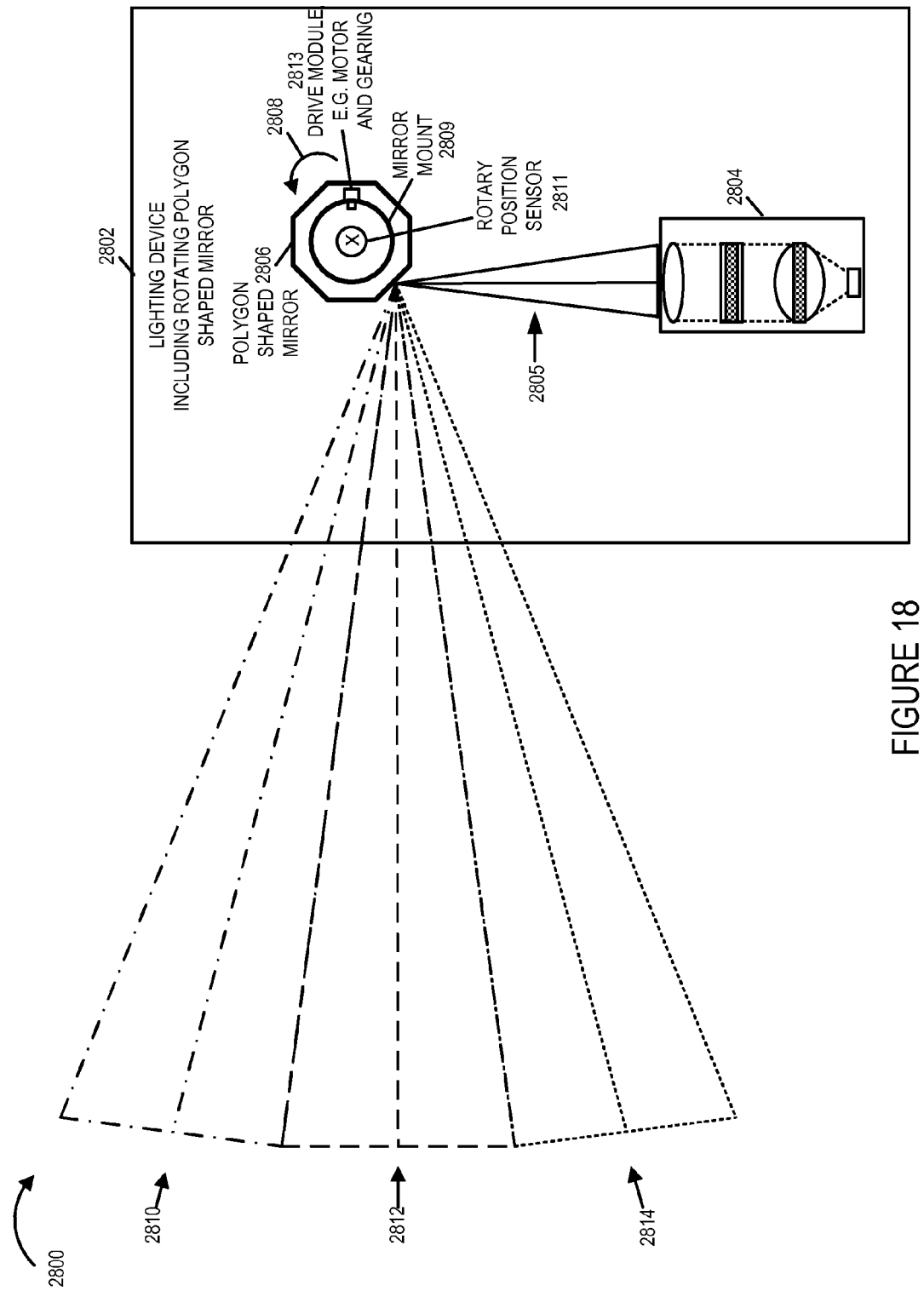
FIG. 18 illustrates an exemplary lighting device including a lighting module and a rotating polygon shaped mirror in accordance with an exemplary embodiment.

FIG. 18 is a drawing 2800 which illustrates an exemplary lighting device 2802 including a lighting module 2804 and a rotating polygon shaped mirror 2806 in accordance with an exemplary embodiment. Lighting modules 2804 is, e.g., a lighting module in accordance with exemplary lighting module 2202 of FIG. 12 and/or lighting module 2202' of FIG. 13. The rotating polygon shaped mirror 2806 redirects the output beam 2805 from the lighting module 2804. Polygon shaped mirror 2806 is attached to mirror mount 2809, which can be rotated as indicated by arrow 2808. Drive module 2813, e.g., a motor and gearing, is used to move mirror mount 2809 with attached polygon shaped mirror 2806. Rotary position sensing device 2811, e.g., a resolver, a synchro, or an optical position sensing device, is used to measure the rotary position to which the polygon shaped mirror is set. In this example, three exemplary output beams (2810, 2812, 2814) are shown corresponding to three different position setting of the polygon shaped mirror along 1 face of the polygon shaped mirror.

Figure 19:
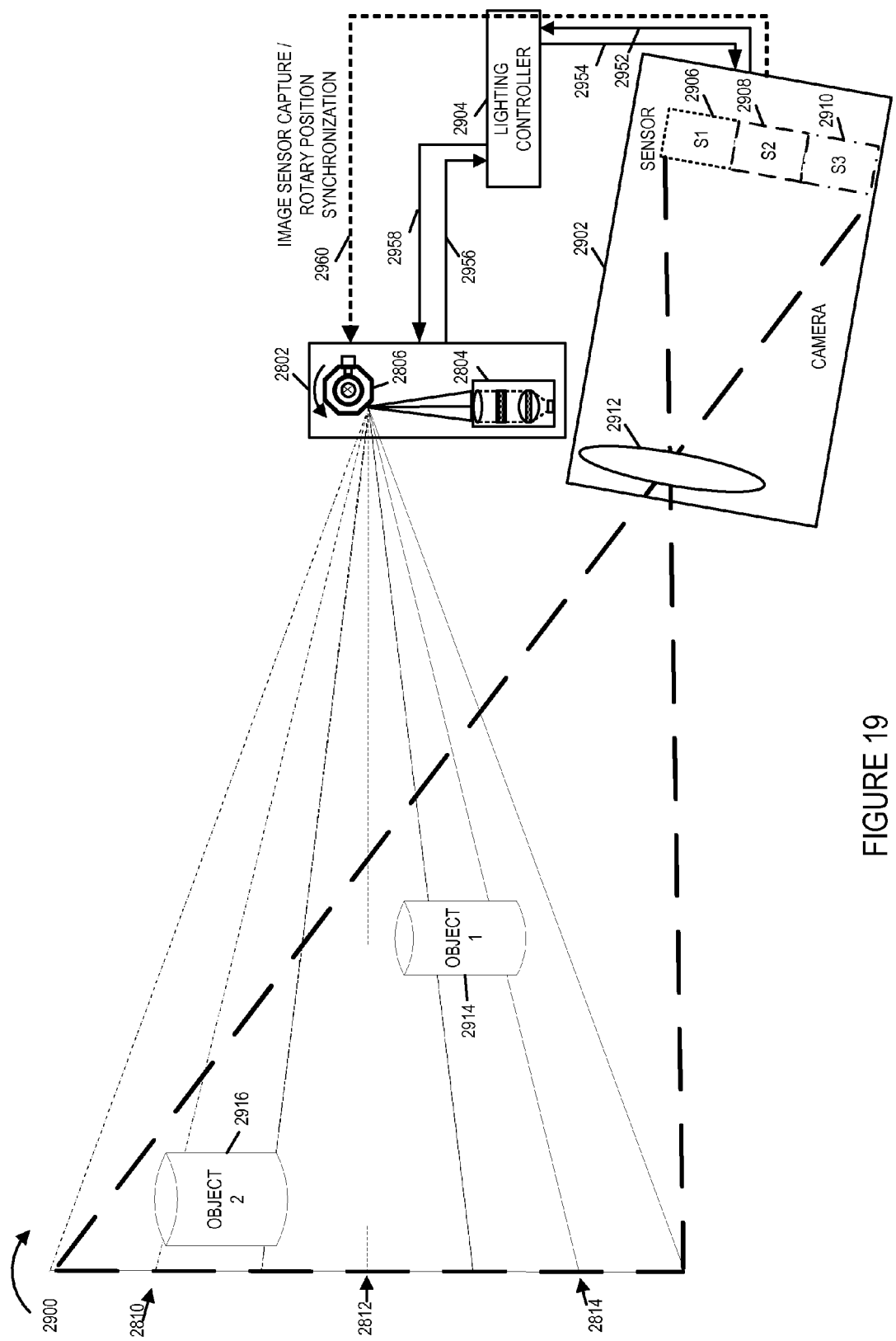
FIG. 19 illustrates an exemplary system including an exemplary lighting device, including a lighting module and a rotating polygon shaped mirror, and an exemplary camera in accordance with an exemplary embodiment.

FIG. 19 is a drawing 2900 which illustrates an exemplary system including exemplary lighting device 2802 of FIG. 18, including a rotating polygon shaped mirror, an exemplary camera 2902, and a lighting controller 2904 in accordance with an exemplary embodiment.

Exemplary camera 2902 includes a lens 2912 for focusing captured received light corresponding to an image scene area onto a plurality of sensors (S1 2906, S2 2908, S3 2910) for capturing an image. In some embodiments, S1 2906, S2 2908 and S3 2910 are different sensors. In some other embodiments, S1 2906, S2 2908 and S3 2910 are different portions of a larger single sensor. In this example different portions of the image scene area are captured by different sensors (2906, 2908, 2910), e.g., at different times.

In this example, there are two exemplary objects (object 1 2914 and object 2 2916) in the image scene area being captured by camera 2902. A first portion of object 2 2916 is illuminated by output beam 2810 from lighting device 2802, corresponding to a first angular setting of the rotating polygon shaped mirror, and a second portion of object 2 2916 is illuminated by output beam 2812 from lighting device 2802, corresponding to a second angular setting of the rotating polygon shaped mirror.

A first portion of object 1 2914 is illuminated by output beam 2812 from lighting device 2802, corresponding to the second angular setting of the rotating polygon shaped mirror, and a second portion of object 1 2914 is illuminated by output beam 2814 from lighting device 2802, corresponding to a third angular setting of the rotating polygon shaped mirror.

Consider that sensor S3 2910 captures the portion of the image scene area which is illuminated by light beam 2810; consider that sensor S2 2908 captures the portion of the image scene area which is illuminated by light beam 2812; and consider that sensor S1 2910 captures the portion of the image scene area which is illuminated by light beam 2814.

Lighting controller 2904 receives signals 2952, e.g., an image capture timing synchronization signal, from camera 2902 and sends signals 2954, e.g., an acknowledgment signal, to camera 2902. Lighting controller 2904 sends signals 2958, e.g., an angular position setting control signal and/or a timing synchronization signal, to lighting device 2802 and receives signals 2856, e.g., an angular position measurement signal, from lighting device 2802. In some embodiments, the rotating polygon shaped mirror is controlled using closed loop control under the direction of the lighting controller 2904. In some embodiments, the lighting module 2804 is controlled under the direction of the lighting controller 2904 to be on during time intervals including image capture time intervals. In some such embodiments, during at least some other time intervals, the lighting module 2804 of lighting device 2802 is controlled to be in an off state, e.g., to conserve power.

Lighting controller 2904 synchronizes operation between image sensor capture, rotating polygon shaped mirror and lighting module on state, such that the portion of the image scene being captured at a give time is being illuminated.

For example, lighting module 2804 is controlled by lighting controller 2904 to be turned on and rotating polygon shaped mirror 2806 is controlled to be set to a first angular position setting to generate beam 2814 while corresponding sensor S1 2806 is capturing a first portion of the image scene area; lighting module 2804 is controlled by lighting controller 2904 to be turned on and rotating polygon shaped mirror 2806 is controlled to be set to a second angular position setting while corresponding sensor S2 2908 is capturing a second portion of the image scene area; and lighting module 2804 is controlled by lighting controller 2904 to be turned on and rotating polygon shaped mirror 2806 is controlled to be set to a third angular setting while corresponding sensor S3 2910 is capturing a third portion of the image scene area. In this example, the one rotation of 8 sided polygon shaped mirror can produce 8 iterations of beams (2814, 2812, 2810).

In some embodiments, the polygon shaped mirror is controlled to be gradually rotated, generating a sweeping light beam, such that the sweeping light beam covers the portion of the image scene area being captured by a given sensor at a given time.

Figure 20:
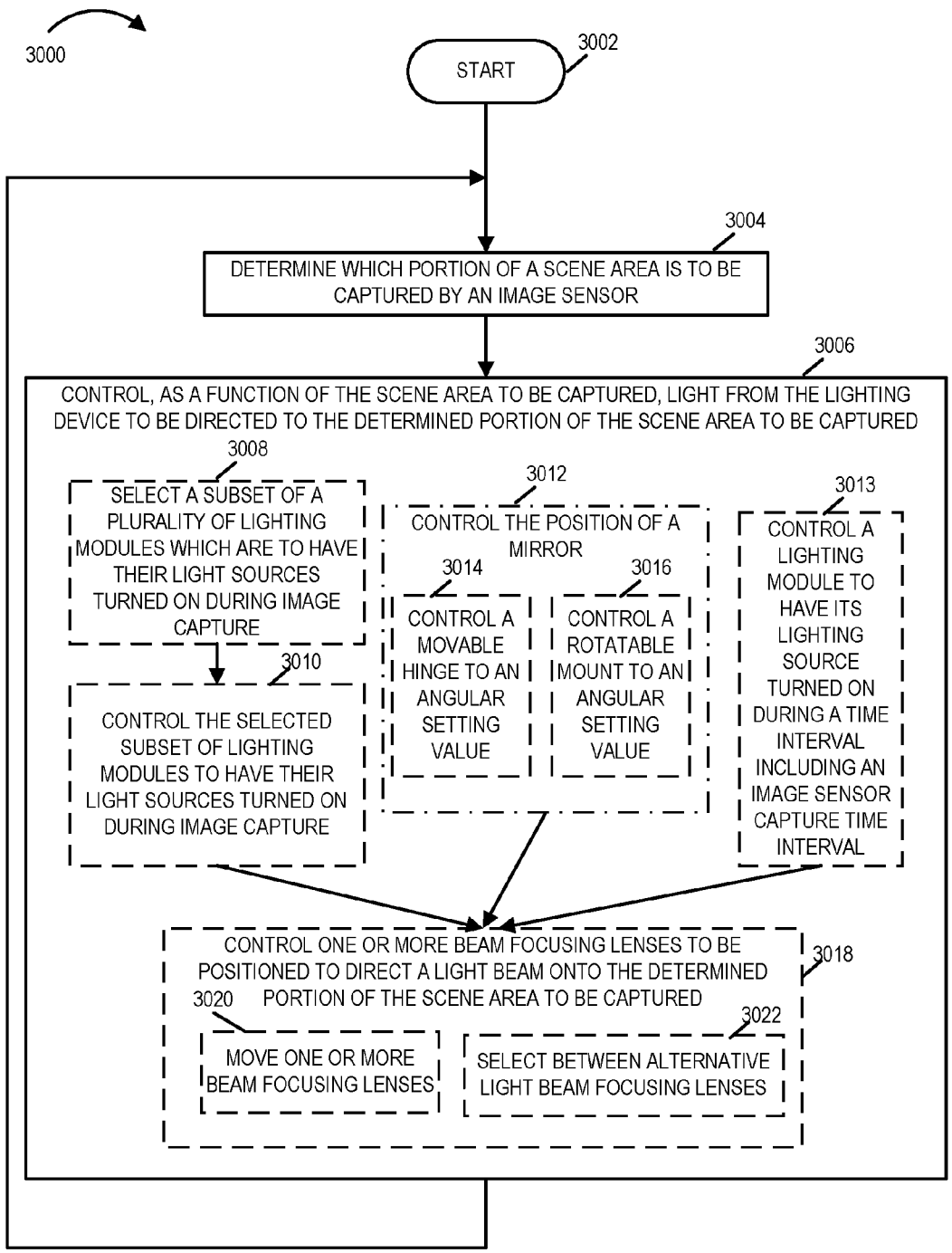
FIG. 20 illustrates an exemplary method of controlling a lighting device in accordance with an exemplary embodiment.

FIG. 20 is a flowchart 3000 of an exemplary method of controlling a lighting device in accordance with an exemplary embodiment. The lighting device is, e.g., lighting device 3100 of FIG. 21. In some embodiments, the lighting device includes at least one lighting module, each lighting module including a light source, e.g., an LED, a collimating lens positioned in front of the light source and for generating a beam of light from said light source; and at least a first beam flattening lens for flattening the beam of light in at least a first direction as it passes through the first beam flattening lens. The exemplary method of flowchart 3000 may be performed by a lighting controller, e.g., a lighting controller device. In some embodiments, the lighting controller is included in a camera device. In some embodiments, the lighting controller is included in the lighting device. In some embodiments, both the lighting controller and the lighting device are included in a camera device. Operation starts in step 3002, e.g., in which initialization occurs, and proceeds to step 3004. In step 3004 the lighting controller determines which portion of a scene area is to be captured by an image sensor during an image capture time interval corresponding to the sensor. Operation proceeds from step 3004 to step 3006.

In step 3006, the lighting controller controls, as a function of the scene area to be captured, light from the lighting device to be directed to the determined portion of the scene area to be captured, said lighting device includes at least one of a plurality of lighting modules, different lighting modules corresponding to different scene area, or a mirror for redirecting a light beam output from a lighting module. In some embodiments, e.g., embodiments, including a plurality of lighting modules, step 3006 includes step 3008 and step 3010. In step 3008 the lighting controller selects a subset of a plurality of lighting modules which are to have their lighting sources turned on during image capture. Operation proceeds from step 3008 to step 3010. In step 3010 the lighting controller controls the selected subset of lighting modules to have their light sources turned on during image capture. In various embodiments, the lighting sources which are turned on are controlled to remain on during a time interval in which image sensor capture occurs corresponding to the determined portion of the scene area of interest. In various embodiments, different subsets of lighting modules are selected and controlled to be on at different points in time corresponding to different portions of the scene area that are to be captured, e.g., corresponding to different sensors.

In some embodiments, step 3006 includes step 3012 and step 3013. In step 3012 the lighting controller controls the position of a mirror. Step 3012 includes step 3014 or step 3106. In some embodiments, the mirror is mounted on a movable hinge, e.g., the mirror is a beam mirror on movable hinge. In step 3014 the lighting controller controls a movable hinge to an angular setting value. In various embodiments, the movable hinge is set to different angular setting values, at different times, corresponding to different portions of the scene area that are to be captured.

In some embodiments, the mirror is a multi-faced mirror on a rotatable mount, e.g., a polygon shaped mirror on a rotatable mount. In step 3016 the lighting controller controls a rotatable mount, on which the multi-faced mirror is mounted, to an angular setting value. In various embodiments, the rotatable mount is set to different angular setting values corresponding to different portions of the scene area that is to be captured at different times. In some embodiments, the mirror is gradually rotated to generate a sweeping illumination beam which covers the portion of the scene area that is being captured by a sensor during an image sensor capture time interval.

In step 3013 the lighting controller controls a lighting module to have its lighting source turned on during a time interval including an image capture time interval.

In some embodiments, e.g., an embodiment including a movable lens for focusing a light beam or an embodiment including alternative switchable lenses for focusing a light beam, step 3006 includes step 3018. In step 3018 one or more beam focusing lenses are positioned to direct a light beam onto the determined portion of the scene area to be captured.

In some embodiments step 3018 includes step 3020 in which one or beam focusing lenses are moved. For example, lens 3170 is moved by lens positioning device 3172, under control of lighting controller 3138 to direct a light beam generated by first lighting module 3102 onto a portion of a scene area to be captured.

In some embodiments, step 3108 includes step 3022 in which a selection is made between light beam alternative light beam focusing lenses. For example, lens B 3176 is selected from the alternative set of lens A 3174 and lens B 3176 moved into position by lens switching device 3178, under control of lighting controller 3138 to direct a light beam generated by first lighting module 3102 onto a portion of a scene area to be captured, where lens A 3174 and lens B 3176 have different focal lengths.

Operation proceeds from step 3006 to step 3004, in which the lighting controller determines a different portion of the scene area which is to be captured corresponding to another image sensor or another portion of the image sensor, and corresponding to another image sensor time interval.

In some embodiments, the lighting device is mounted on a camera which includes the image sensor. In some embodiments, the lighting device is positioned in proximity to a camera which includes the image sensor and is in electrical or wireless communication with the camera device. In some embodiments, the method of flowchart 20 is performed by a controller which is mounted inside the body of the camera device. In some embodiments, the method of flowchart 3000 is performed by a controller which is mounted inside the body of the lighting device. In some embodiments, the lighting device is included in a camera device.

Figure 21:
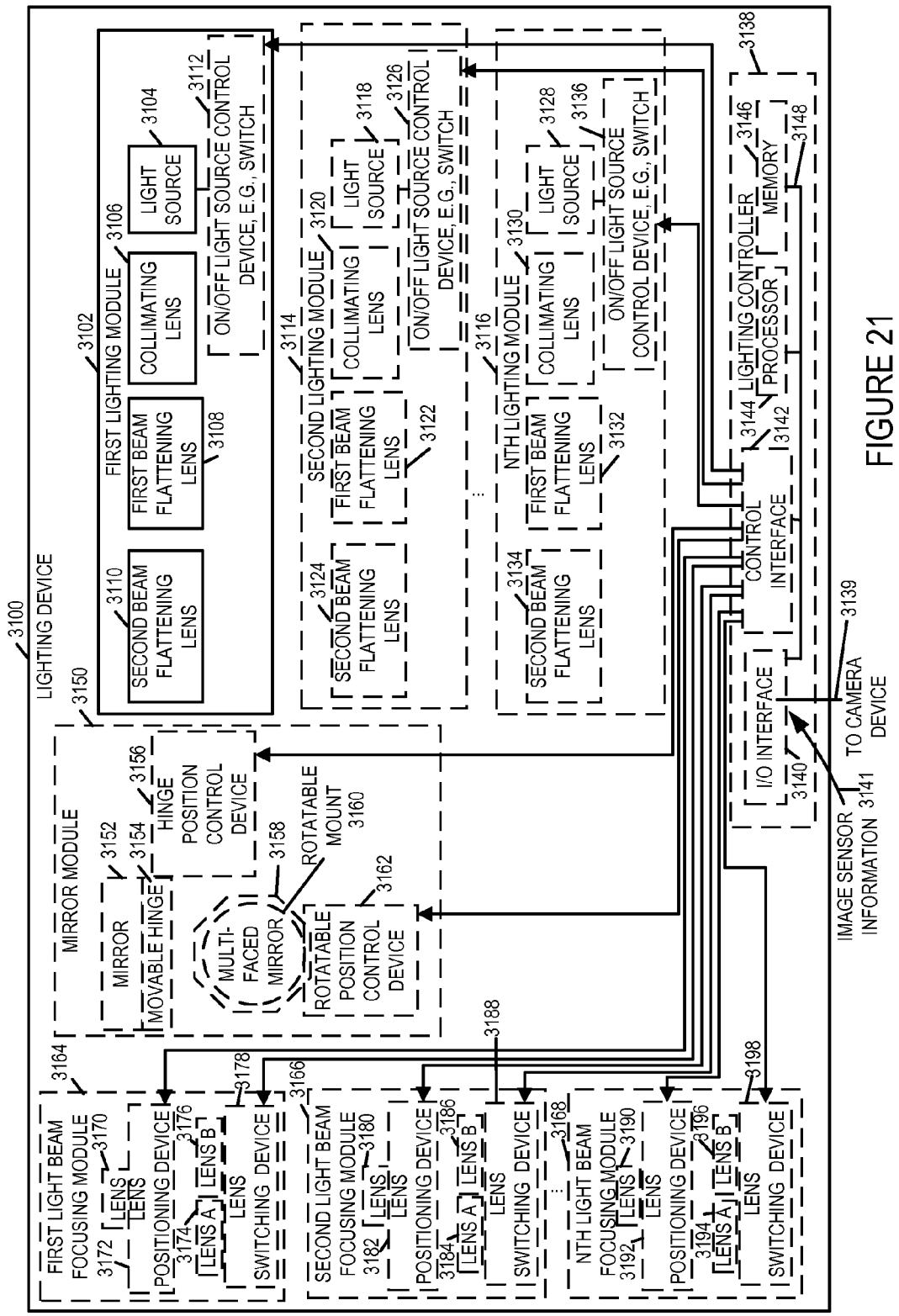
FIG. 21 is a drawing of an exemplary lighting device in accordance with various exemplary embodiments.

FIG. 21 is a drawing of an exemplary lighting device 3100 in accordance with various exemplary embodiments. Lighting device 3100 includes a first lighting module 3102. The first lighting module 3102 includes a light source 3104, e.g., a light emitting diode (LED) light source, a collimating lens 3106, a first beam flattening lens 3108 and a second beam flattening lens 3110. In some embodiments, first lighting module 3102 further includes an On/Off light source control device 3112, e.g., a switch, coupled to light source 3104. The collimating lens 3106 is positioned in front of the light source 3104 and is for generating a beam of light from the light output from the light source 3104. The first beam flattening lens 3108 is for flattening the beam of light in at least a first direction as it passes through the first beam flattening lens 3108. In some embodiments, the first beam flattening lens 3108 is one of a cylindrical lens or an astigmatic lens. The second beam flattening lens 3110 is for flattening a beam of light output by the first beam flattening lens in a direction which is different from the first direction. In some embodiments, the first and second directions are perpendicular to each other. In various embodiments, the first and second beam flattening lenses (3108, 3110) are complex astigmatic lenses. In some embodiments, the first direction is one of a vertical or horizontal direction and the second direction is one the vertical or horizontal direction and is a different direction than the first direction.

In various embodiments, lighting device 3100 includes a plurality of lighting modules (first lighting module 3102, second lighting module 3114, . . . , Nth lighting module 3116). The second lighting module 3114 includes a light source 3118, e.g., a light emitting diode (LED) light source, a collimating lens 3120, a first beam flattening lens 3122 and a second beam flattening lens 3124. The collimating lens 3120 is positioned in front of the light source 3118 and is for generating a beam of light from the light output from the light source 3118. The first beam flattening lens 3122 is for flattening the beam of light in at least a first direction as it passes through the first beam flattening lens 3122. In some embodiments, the first beam flattening lens 3122 is one of a cylindrical lens or an astigmatic lens. The second beam flattening lens 3124 is for flattening a beam of light output by the first beam flattening lens 3122 in a direction which is different from the first direction. In some embodiments, the first and second directions are perpendicular to each other. In various embodiments, the first and second beam flattening lenses (3122, 3124) are complex astigmatic lenses. In some embodiments, the first direction is one of a vertical or horizontal direction and the second direction is one the vertical or horizontal direction and is a different direction than the first direction. In some embodiments, the second lighting module 3114 further includes an On/Off light source control device 3126, e.g., a switch, coupled to light source 3126.

The Nth lighting module 3116 includes a light source 3128, e.g., a light emitting diode (LED) light source, a collimating lens 3130, a first beam flattening lens 3132 and a second beam flattening lens 3134. The collimating lens 3130 is positioned in front of the light source 3128 and is for generating a beam of light from the light output from the light source 3128. The first beam flattening lens 3132 is for flattening the beam of light in at least a first direction as it passes through the first beam flattening lens 3132. In some embodiments, the first beam flattening lens 3132 is one of a cylindrical lens or an astigmatic lens. The second beam flattening lens 3134 is for flattening a beam of light output by the first beam flattening lens 3132 in a direction which is different from the first direction. In some embodiments, the first and second directions are perpendicular to each other. In various embodiments, the first and second beam flattening lenses (3132, 3134) are complex astigmatic lenses. In some embodiments, the first direction is one of a vertical or horizontal direction and the second direction is one the vertical or horizontal direction and is a different direction than the first direction. In some embodiments, the Nth lighting module 3116 further includes an On/Off light source control device 3136, e.g., a switch, coupled to light source 3128.

In some embodiments, the lighting device 3100 includes a lighting controller 3138. The lighting controller 3138 includes an I/O interface 3140, a control interface 3142, a processor 3134, e.g., a CPU, and memory 3146, coupled together via a bus 3138 over which the various elements may interchange data and information. I/O interface 3140, e.g., a wired or wireless interface, couples the lighting device 3100 to a camera device, e.g., via a link 3139. Information received over link 3139 includes image sensor information 3141, e.g., information identifying which one or more sensors are being used during a capture time interval, information identifying which portion of a sensor is being used during a capture time interval, information to facilitate synchronization between a sensor capturing a portion of an image and an image area to be illuminated at a given time, information identifying a scene area to be illuminated during a given capture time interval, e.g., corresponding to a image sensor or portion of an image sensor, etc. Control interface 3142 communicates with various control devices within lighting device 3100, e.g., activating or deactivating a light source in a lighting module, controlling a mirror position, controlling movement of a mirror, controlling a focusing module to move a focusing lens, and/or controlling a focusing module to select and use a particular lens from a plurality of alternative lenses, etc., to illuminate a portion of scene area during an image capture time interval corresponding to a sensor or a portion of a sensor which is performing image capture during the time interval.

The lighting controller 3138, in some embodiments, is for controlling which one of the first lighting modules 3102 and additional lighting modules (3114, . . . , 3116) have their light sources (3104, 3118, . . . , 3128) on at a given point in time based on which portion of a scene area is being captured by a image sensor at the given point in time. In some such embodiments, the lighting controller 3138 is configured to control the light source of different one of said first lighting modules and additional lighting modules so that less than all the lighting modules are on at the given point in time.

In some embodiments, lighting device 3100 further includes a mirror module 3150. In some such embodiments, the mirror module 3150 includes a mirror 3152, a movable hinge 3154 and a hinge position control device 3156. Mirror 3152 is for redirecting a light beam output by a second beam flattening lens, e.g., second beam flattening lens 3110, under the direction of the lighting controller 3138. Mirror 3152, e.g., a beam mirror, is mounted on movable hinge 3154. In some embodiments, lighting controller 3138 controls movement of said hinge 3154 as a function of which scene area is being captured by the image sensor at the given point in time.

In some other embodiments, the mirror module 3150 includes a multi-faced mirror 3158, a rotatable mount 3160, and a rotatable position control device 3162. Multi-faced mirror 3154 is mounted on rotatable mount 3160. In some such embodiments, lighting controller 3138 controls movement of the rotatable mount as a function of which scene area is being captured by said image sensor at the given point in time.

In some embodiments, the lighting device 3100 further includes one or more light beam focusing modules (first light beam focusing module 3164, second light beam focusing module 3166, . . . , Nth light beam focusing module 3168).

In some embodiments, each of the light beam focusing modules include a lens, e.g., a movable lens, and a lens positioning device. The lens positioning device includes, e.g., a mirror mount, a drive motor for moving the mirror, and a position sensor for determining current mirror position. For example, first light beam focusing module 3164 includes a lens 3170, and lens positioning device 3172; second light beam focusing module 3166 includes a lens 3180, and lens positioning device 3182; and Nth light beam focusing module 3168 includes a lens 3190, and lens positioning device 3192.

In some other embodiments, each of the light beam focusing modules includes a plurality of alternative lens and a lens switching device. For example, first light beam focusing module 3164 includes a lens A 3174, lens B 3176, and lens switching device 3178; second light beam focusing module 3166 includes a lens A 3184, lens B 3186, and lens switching device 3188; and light beam focusing module N 3168 includes a lens A 3194, lens B 3196, and lens switching device 3198.

Control device 3138, control one or more or all of: On/Off source control device 3112, On/Off source control device 3126, On/Off source control device 3136, hinge position control device 3156, rotatable position control device 3162, lens positioning device 3172, lens positioning device 3182, lens positioning device 3192, lens switching device 3178, lens switching device 3188, and lens switching device 3198.

In various embodiments the lighting device 3100 is mounted on a camera which includes said image sensor. In some embodiments, the lighting device is positioned in proximity to a camera which includes said image sensor and is in electrical or wireless communication with said camera.

In some embodiments, the lighting controller 3138 is mounted inside the body of said camera. In some embodiments, the lighting device is part of a camera which includes the image sensor.

In one exemplary embodiment, lighting device 2402 of FIG. 14-15 is lighting device 3100 of FIG. 21; lighting modules (2404, 2406, 2408) are lighting modules (3102, 3114, 3116), respectively; lighting controller 2504 is lighting controller 3138, and the lighting controller is included in the lighting device. In another exemplary embodiment, lighting device 2402 of FIG. 14-15 is lighting device 3100 of FIG. 21; lighting modules (2404, 2406, 2408) are lighting modules (3102, 3114, 3116), respectively; lighting controller 2504 is lighting controller 3138, and the lighting controller is external to the lighting device, e.g., as a standalone device or included in a camera device.

In another exemplary embodiment, lighting device 2602 of FIG. 16-17 is lighting device 3100 of FIG. 21; lighting module 2604 is lighting module 3102; mirror 2606 is mirror 3152; hinge 2613 is hinge 3154; lighting controller 2704 is lighting controller 3138, and the lighting controller is included in the lighting device. In another exemplary embodiment, lighting device 2602 of FIG. 16-17 is lighting device 3100 of FIG. 21; lighting module 2604 is lighting module 3102; mirror 2606 is mirror 3152; hinge 2613 is hinge 3154; lighting controller 2704 is lighting controller 3138, and the lighting controller is external to the lighting device, e.g., as a standalone device or included in a camera device.

In another exemplary embodiment, lighting device 2802 of FIG. 18-19 is lighting device 3100 of FIG. 21; lighting module 2804 is lighting module 3102; mirror 2806 is mirror 3158; rotatable mount 2809 is rotatable mount 3160; lighting controller 2904 is lighting controller 3138, and the lighting controller is included in the lighting device. In another exemplary embodiment, lighting device 2802 of FIG. 18-19 is lighting device 3100 of FIG. 21; lighting module 2804 is lighting module 3102; mirror 2806 is mirror 3158; rotatable mount 2809 is rotatable mount 3160; lighting controller 2704 is lighting controller 3138, and the lighting controller is external to the lighting device, e.g., as a standalone device or included in a camera device.

In another exemplary embodiment lighting device 3100 is light emitting module 104 included in camera device 100 of FIG. 1A. In some exemplary embodiments, light control device 152 is lighting controller 3138. In some embodiments, the lighting controller is included within the lighting device within the camera device 100. In some embodiments, the lighting controller is included within the camera device external to the lighting device.

An exemplary method of controlling an imaging device including multiple light emitting elements and at least one sensor with a rolling shutter, in accordance with some embodiments, comprises: operating the rolling shutter to control sequential capture of different image areas by an image sensor; and operating different light emitting elements at different times depending on the image area being captured by said image sensor at a particular point in time. In some such embodiments, said rolling shutter is an electronic shutter that controls reading out of different portions of said image sensor at different times. In some such embodiments, said multiple light emitting elements includes an array of light emitting elements.

In some embodiments, operating different light emitting elements at different times depending on the image area being captured includes: controlling different sets of light emitting elements in said array to emit light at different times.

In various embodiments, said light emitting elements include a plurality of sets of light emitting elements, each set of light emitting elements corresponding to different image areas which are captured by said sensor; and operating different light emitting elements at different times depending on the image area being captured includes: operating a first set of light emitting elements corresponding to a first image area during a first period of time, determined based on the timing of said rolling shutter, during which a first portion of said sensor is exposed for image capture. In some such embodiments, operating different light emitting elements at different times depending on the image area being captured further includes: operating a second set of light emitting elements corresponding to a second image area which is different from said first image area during a second period of time, determined based on the timing of said rolling shutter, during which a second portion of said sensor corresponding is being exposed for image capture. In some such embodiments, said first period of time includes at least a portion of time which does not overlap said second period of time.

In some embodiments, operating the second set of light emitting elements includes controlling said second set of light emitting elements to be off during said portion of time included in said first period of time which does not overlap said second period of time. In various embodiments, operating different light emitting elements at different times depending on the image area being captured by said image sensor at a particular point in time includes: determining when said first and second set of light emitting elements are to be on based on an exposure setting and a speed of said rolling shutter.

In some embodiments, different sets of light emitting elements in said plurality of light emitting elements are covered with different lenses, and the method further comprising: determining which sets of light emitting elements to use based on an effective focal length setting being used by said imaging device for image capture.

In various embodiments, said focal length is user selectable, and the method further comprises: determining the focal length from a user setting prior to determining which set of light emitting elements to use. In some such embodiments, said focal length is set by a user via a zoom control input.

An exemplary camera device, in accordance with some embodiments, comprises: a rolling shutter; at least one sensor; a plurality of light emitting elements; and a light control element configured to control said light emitting elements in a synchronized manner with operation of said rolling shutter. In some such embodiments, said rolling shutter is an electronic shutter that controls reading out of different portions of said image sensor at different times. In various embodiments, said multiple light emitting elements includes an array of light emitting elements.

In some embodiments, said light control device is configured to control different sets of light emitting elements in said array to emit light at different times in a manner that is synchronized with the timing of said rolling shutter. In some embodiments, said light emitting elements include a plurality of sets of light emitting elements, each set of light emitting elements corresponding to a different image area which is captured by a different portion of said sensor. In various embodiments, said light control device is configured to control a first set of light emitting elements corresponding to a first image area to output light during a first time period, said first time period being determined based on the timing of said rolling shutter and being a period of time during which a first portion of said sensor is exposed for image capture.

In some embodiments, said light control device is configured to control a second set of light emitting elements corresponding to a second image area to output light during a second time period, said second time period being determined based on the timing of said rolling shutter and being a period of time during which a second portion of said sensor is exposed for image capture. In some embodiments, said light control device is configured to control an Nth set of light emitting elements corresponding to an Nth image area to output light during a third time period, said Nth time period being determined based on the timing of said rolling shutter and being a period of time during which an Nth portion of said sensor is exposed for image capture, N being an integer value corresponding to the total number of time periods used by said rolling shutter to complete one full read out of said image sensor.

In various embodiments, said first time period includes at least a portion of time which does not overlap said second time period. In some embodiments, said Nth time period does not overlap said first and second time periods, and where N is greater than 4.

In some embodiments, said light control device is configured to control said second set of light emitting elements to be off during said portion of time included in said first period of time which does not overlap said second period of time. In some embodiments, said light control device is configured to determine when said first set and said second set of light emitting elements are to be based on an exposure setting. In some such embodiments, said light control device is further configured to determine when said first set and said second set of light emitting elements are to be based on an amount of time between read outs of different portions of said sensor.

In some embodiments, different sets of light emitting elements in said plurality of light emitting elements are covered with different lenses. In some such embodiments, said light control device is further configured to: determine which sets of light emitting elements to use based on an effective focal length setting being used by said camera device. In some such embodiments, said focal length is user selectable, the camera device further comprises: a focal length determination module configured to determine the focal length from a user setting. In some embodiments, said focal length is set by a user via a zoom control input.

An exemplary lighting device, in accordance with some embodiments, comprises: a first lighting module, the first lighting module including: a light source; a collimating lens positioned in front of said light source and for generating a beam of light from light output by said light source; and at least a first beam flattening lens for flattening the beam of light in at least a first direction as it passes through the first beam flattening lens. In various embodiments, said light source is a light emitting diode (LED) light source. In some embodiments, the first beam flattening lens is one of a cylindrical lens or an astigmatic lens.

In various embodiments, the lighting device further comprises: a second beam flattening lens for flattening a beam of light output by the first beam flattening lens in a direction which is different from said first direction.

In some embodiments, the first and second directions are perpendicular to each other. In some embodiments, said first and second beam flattening lenses are complex astigmatic lens.

In some embodiments, the first direction is one of a vertical direction or a horizontal direction; and the second direction is one of the vertical direction or the horizontal direction and is a different direction than said first direction.

The lighting device, in various embodiments, further comprises: a plurality of additional lighting modules, each of said additional lighting modules each including a light source; a collimating lens positioned in front of said light source and for generating a beam of light from light output by said light source; and at least a first beam flattening lens for flattening the beam of light in at least a first direction as it passes through the first beam flattening lens. In some embodiments, each of light sources are LED light sources In some embodiments, further comprises: a lighting controller for controlling which ones of said first lighting module and additional lighting modules have their light sources on at a given point in time based on which portion of a scene area is being captured by an image sensor at the given point in time. In some such embodiments, said lighting controller is configured to control the light source of different ones of said first lighting module and additional lighting modules so that less than all the lighting modules are on at the given point in time.

In various embodiments, the lighting device further comprises: a mirror for redirecting a light beam output by said second beam flattening lens under direction of a lighting controller. In some such embodiments, said lighting controller is configured to control movement of said mirror as a function of image sensor capture of different scene areas over time. In some embodiments, the mirror is mounted on a movable hinge; and said lighting controller controls movement of said hinge as a function of which scene area is being captured by said image sensor at the given point in time. In some other embodiments, the mirror is a multi-faced mirror on a rotatable mount; and said lighting controller controls movement of said rotatable mount as a function of which scene area is being captured by said image sensor at the given point in time.

In some embodiments, the lighting device is mounted on a camera which includes said image sensor. In some embodiments, said lighting device is positioned in proximity to a camera which includes said image sensor and is in electrical or wireless communication with said camera. In some embodiments, the controller is mounted inside the body of said camera. In some embodiments, the lighting device lighting device is part of a camera which includes the image sensor.

An exemplary method of controlling a lighting device, in accordance with some embodiments, comprises: determining which portion of a scene area is to be captured by an image sensor during an image sensor capture time interval; and controlling, as a function of the scene area to be captured, light from the lighting device to be directed to the determined portion of the scene area to be to be captured, said lighting device including at least one of a plurality of lighting modules, different lighting modules corresponding to different scene areas, or a mirror for redirecting a light beam output from said lighting module. In some such embodiments, different portions of said scene area correspond to different image sensors. In some other embodiments, different portions of said scene area correspond to different portion of an image sensor.

In some embodiments, different image sensors correspond to different subsets of turned on lighting modules. In some embodiments, different image sensors correspond to different mirror control positions.

In some embodiments, controlling light from the lighting device to be directed to the determined portion of the scene area to be to be captured includes: selecting a subset of said plurality of lighting modules which are to have their light sources on during image capture; and controlling the selected subset of lighting modules to have their light sources turned on during image capture.

In various embodiments, different subsets of lighting devices are selected and controlled to be on at different points in time corresponding to different portions of the scene area that is to be captured.

In some embodiments, controlling light from the lighting device to be directed to the determined portion of the scene area to be to be captured includes: controlling the position of said mirror. In some such embodiments, the mirror is mounted on a movable hinge; and controlling the position of said mirror includes controlling the movable hinge to an angular setting value. In some such embodiments, the movable hinge is set to different angular setting values corresponding to different portions of the scene area that are to be captured.

In some embodiments, the mirror is a multi-faced mirror on a rotatable mount; and controlling the position of said mirror includes controlling the rotatable mount to an angular setting value. In some such embodiments, the rotatable mount is set to different angular setting values corresponding to different portions of the scene area that is to be captured.

In various embodiments, said lighting device is mounted on a camera which includes said image sensor. In some embodiments, the lighting device is positioned in proximity to a camera which includes said image sensor and is in electrical or wireless communication with said camera.

In some embodiments, the method is performed by a controller which is mounted inside the body of said camera. In some embodiments, the method is performed by a controller which is mounted inside the body of said lighting device.

In some embodiments, said lighting device is part of a camera which includes at least one image sensor. The techniques of various embodiments may be implemented using software, hardware and/or a combination of software and hardware. Various embodiments are directed to apparatus, e.g., a camera device, an image processing device or a system. Various embodiments are also directed to methods, e.g., a method of generating combined pixel values from sets of input pixel values corresponding to an image area where each set of pixel values may be provided by a different optical chain module. Various embodiments are also directed to machine, e.g., computer, readable medium, e.g., ROM, RAM, CDs, hard discs, etc., which include machine readable instructions for controlling a machine, e.g., camera device, processor or image processing system, to implement one or more steps of one or more of the methods described in the present application.

In various embodiments apparatus described herein are implemented using one or more modules to perform the steps corresponding to one or more methods. Thus, in some embodiments various features are implemented using modules. Such modules may be implemented using software, hardware or a combination of software and hardware. Optical chain modules as should be appreciated include as least some hardware elements such as an image sensor and are therefore normally not implementable purely in software while other modules may be implemented fully in software. In some embodiments in which the modules are implemented in hardware, the modules are implemented as circuits, e.g., of a processor and/or as a combination of hardware elements such as lenses, filters and an image sensor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s).

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a camera device, an image processing device or other type of system. In some embodiments the image processing device is a portable device including a camera, e.g., a cell phone including a camera with a processor that implements the method.

In some embodiments modules are implemented using software, in other embodiments modules are implemented in hardware, in still other embodiments the modules are implemented using a combination of hardware and/or software.

Numerous additional variations on the methods and apparatus of the various embodiments described above will be apparent to those skilled in the art in view of the above description. Such variations are to be considered within the scope of the invention.

What is claimed is:

1. A lighting device comprising:
a first lighting module, the first lighting module including:
a light source;
a collimating lens positioned in front of said light source for generating a beam of light from light output by said light source;
at least a first beam flattening lens for flattening the beam of light in at least a first direction as it passes through the first beam flattening lens, said first beam flattening lens being one of a cylindrical lens or an astigmatic lens; and
a plurality of additional lighting modules, each of said additional lighting modules including:
a light source;
a collimating lens positioned in front of said light source for generating a beam of light from light output by said light source; and
at least one beam flattening lens for flattening the beam of light in at least a first direction as it passes through the first beam flattening lens.

2. The lighting device of claim 1, further comprising:
a second beam flattening lens for flattening a beam of light output by the first beam flattening lens in a second direction which is different from said first direction.

3. The lighting device of claim 2, wherein the first and second directions are perpendicular to each other.

4. The lighting device of claim 3,
wherein the first direction is one of a vertical direction or a horizontal direction; and
wherein the second direction is one of the vertical direction or the horizontal direction and is a different direction than said first direction.

5. The lighting device of claim 1, further comprising:
a lighting controller for controlling which ones of said first lighting module and additional lighting modules have their light sources on at a given point in time based on which portion of a scene area is being captured by an image sensor at the given point in time.

6. The lighting device of claim 5, wherein said lighting controller is configured to control the light source of different ones of said first lighting module and additional lighting modules so that less than all the lighting modules are on at the given point in time.

7. The lighting device of claim 2, further comprising:
a mirror for redirecting a light beam output by said second beam flattening lens under direction of a lighting controller.

8. The lighting device of claim 7, further comprising:
said lighting controller, said lighting controller being configured to control movement of said mirror as a function of image sensor capture of different scene areas over time.

9. The lighting device of claim 8, wherein the mirror is mounted on a movable hinge; and
wherein said lighting controller controls movement of said hinge as a function of which scene area is being captured by said image sensor at the given point in time.

10. The lighting device of claim 8,
wherein the mirror is a multi-faced mirror on a rotatable mount; and
wherein said lighting controller controls movement of said rotatable mount as a function of which scene area is being captured by said image sensor at the given point in time.

11. A method of controlling a lighting device, the method comprising:
determining which portion of a scene area is to be captured by an image sensor during an image sensor capture time interval; and
controlling, as a function of the scene area to be captured, light from the lighting device to be directed to the determined portion of the scene area to be to be captured, said controlling light from the lighting device to be directed to the determined portion of the scene area to be to be captured including controlling the position of a mirror.

12. The method of claim 11, wherein said lighting device includes at least one of i) a plurality of lighting modules, different lighting modules corresponding to different scene areas, or ii) a lighting module and a mirror for redirecting a light beam output from said lighting module.

13. The method of claim 11, wherein different portions of said scene area correspond to different image sensors.

14. The method of claim 13, wherein different image sensors correspond to different subsets of turned on lighting modules.

15. The method of claim 11, wherein the mirror is mounted on a movable hinge; and
  wherein controlling the position of said mirror includes controlling the movable hinge to an angular setting value.

16. The method of claim 11,
  wherein the mirror is a multi-faced mirror on a rotatable mount; and
  wherein controlling the position of said mirror includes controlling the rotatable mount to an angular setting value.

* * * * *